US010345123B2

(12) United States Patent
Berk et al.

(10) Patent No.: US 10,345,123 B2
(45) Date of Patent: Jul. 9, 2019

(54) WATER RESISTANT SMART GAUGE

(71) Applicant: PUSH, INC., Rancho Santa Margarita, CA (US)

(72) Inventors: Todd Berk, Rancho Santa Margarita, CA (US); Craig Smith, Laguna Niguel, CA (US)

(73) Assignee: PUSH, INC., Rancho Santa Margarita, CA (US)

( * ) Notice: Subject to any disclaimer, the term of this patent is extended or adjusted under 35 U.S.C. 154(b) by 330 days.

(21) Appl. No.: 15/201,412

(22) Filed: Jul. 2, 2016

(65) Prior Publication Data
US 2017/0003149 A1  Jan. 5, 2017

Related U.S. Application Data

(60) Provisional application No. 62/188,643, filed on Jul. 4, 2015.

(51) Int. Cl.
*G01D 11/26* (2006.01)
*G01D 11/24* (2006.01)

(52) U.S. Cl.
CPC .............. *G01D 11/26* (2013.01); *G01D 11/24* (2013.01)

(58) Field of Classification Search
CPC .......................... G01D 11/26; G01D 11/245
See application file for complete search history.

(56) References Cited

U.S. PATENT DOCUMENTS

| | | | | |
|---|---|---|---|---|
| 5,870,687 | A * | 2/1999 | Majstorovic | G01P 7/00 701/33.4 |
| 6,973,377 | B2 * | 12/2005 | Majstorovic | F16H 61/0213 307/10.1 |
| 7,013,207 | B2 * | 3/2006 | Majstorovic | F16H 61/0213 701/51 |
| 8,525,723 | B2 * | 9/2013 | Orr | G01S 7/022 340/815.4 |
| 8,983,752 | B2 * | 3/2015 | Harvie | G01G 19/086 701/99 |

OTHER PUBLICATIONS

Dave Vanderwerp & Larry Webster; "Do Inexpensive Performance Meters Work?"; Car and Driver Magazine, May 2005; 19 pages.
(Continued)

*Primary Examiner* — Jamel E Williams
(74) *Attorney, Agent, or Firm* — Alford Law Group, Inc.; William E. Alford

(57) ABSTRACT

In one embodiment, a water resistant smart gauge is disclosed including a housing, a printed circuit board (PCB), a display device, a transparent circular pane, a rear cover, and one or more modules. The PCB is mounted in the housing and has one or more sets of electrical contacts, The display device is mounted in the housing. The transparent circular pane is sealed to a front side of the housing over the display device. The rear cover is sealed to a back side of the housing. The rear cover includes one or more expansion module have sealed openings around the one or more sets of electrical contacts of the PCB. The one or more modules each having a cylindrical shaft with a groove and a sealing ring mounted in the groove. When the cylindrical shaft of the one or more modules are plugged into the one or more expansion openings in the rear cover, they provide a water resistant seal for the smart gauge.

15 Claims, 32 Drawing Sheets

(56) References Cited

OTHER PUBLICATIONS

Tesla Electronics Inc.; "G-TECH/Pro SS/RR Fanatic Manual"; May 2013; 71 pages.
Tesla Electronics Inc.; "G-TECH/Pro EGS Expandable Gauge System user manual"; 2008; 61 pages.
Spot LLC; "The SPOT Personal Tracker"; 2015; 2 pages.
Motec; "ADL3—Advanced Dash Logger Backlit, Datasheet, Part 18015"; Sep. 19, 2014; 4 pages.
Motec; "ADL3 Advanced Dash Logger" Brochure; Dec. 9, 2009; Downloaded Jul. 23, 2015 ; 8 pages.
ADL3—Advanced Dash Logger, Datasheet, Part 18014; Sep. 19, 2014; 4 pages.
MoTeC; "ADL3/EDL3 User Manual"; Sep. 2014; 80 pages.
Motec; "Accident Data Recorder"; Aug. 18, 2014; 16 pages.
Motec; "C125—Race Display Kit, Datasheet, Part 18031"; Sep. 13, 2013; 2 pages.
Motec; "C125—Colour Display Logger, Datasheet, Part 18029"; Apr. 29, 2015; 4 pages.
Motec; "C125—Race Logging Kit, Datasheet, Part 18032"; Sep. 13, 2013; 2 pages.
Motec; "C125 Display Logger, User Manual"; Jun. 2015; 93 pages.
Motec; "Product Catalog", 2014; 44 pages.
Motec; Data Sheets—"C125 Race Loom Terminated, Part 62204"; "C125 Input Loom, Part 61259"; "Two Button Loom, Part 61221"; Jul. and Aug. 2013; 4 pages.

\* cited by examiner

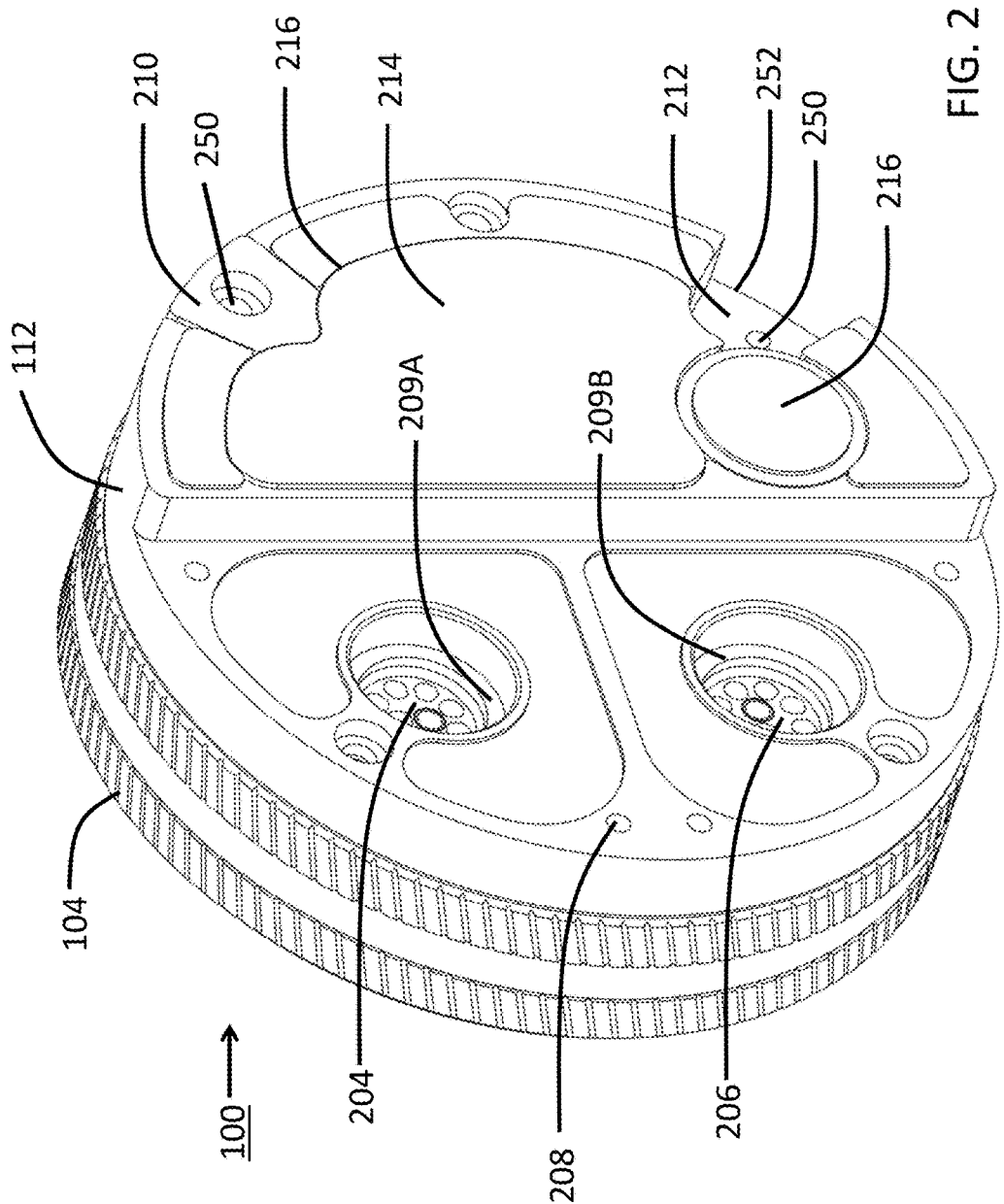

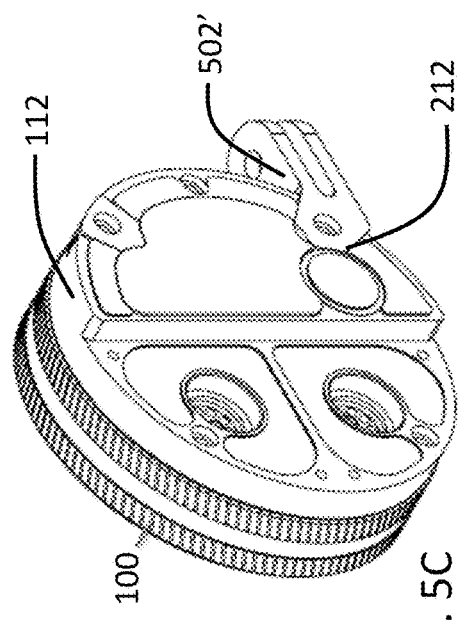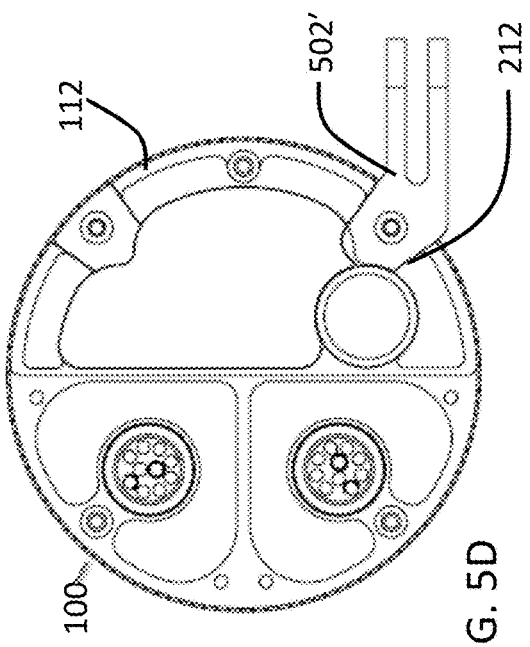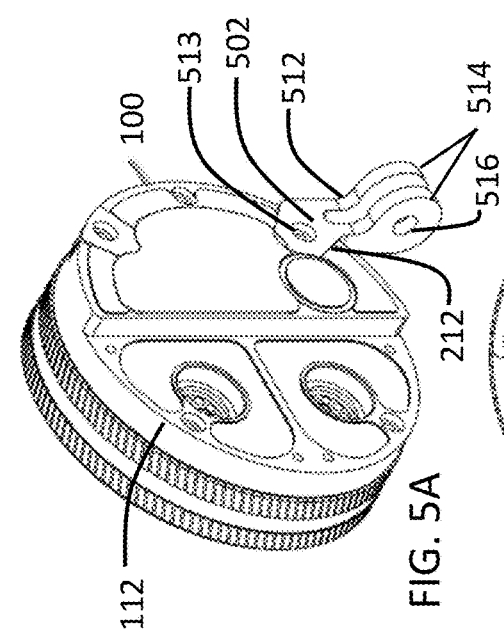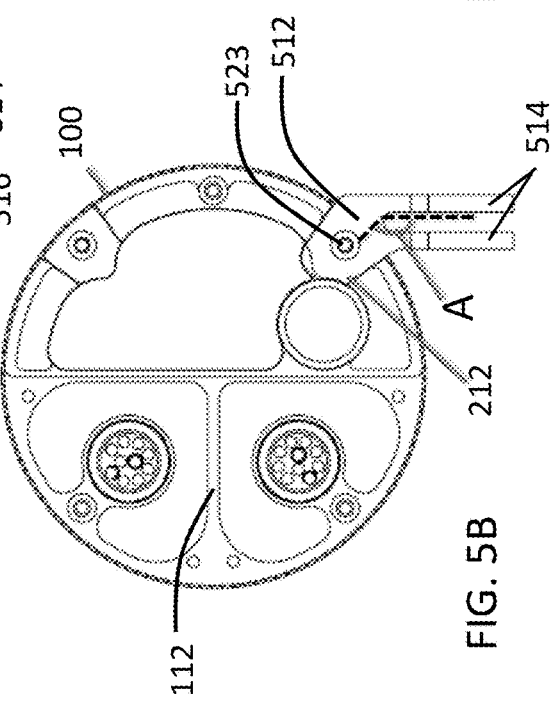

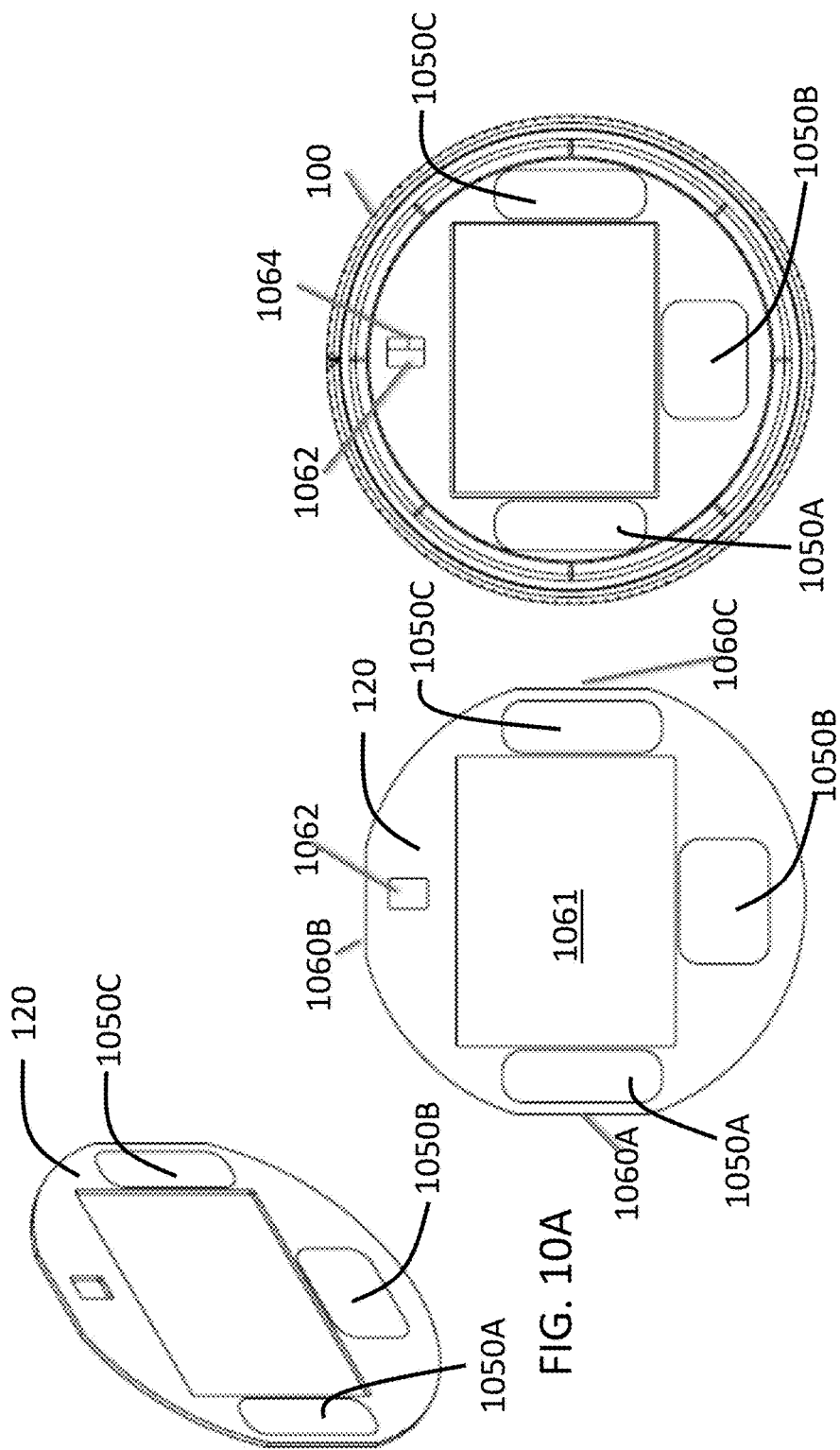

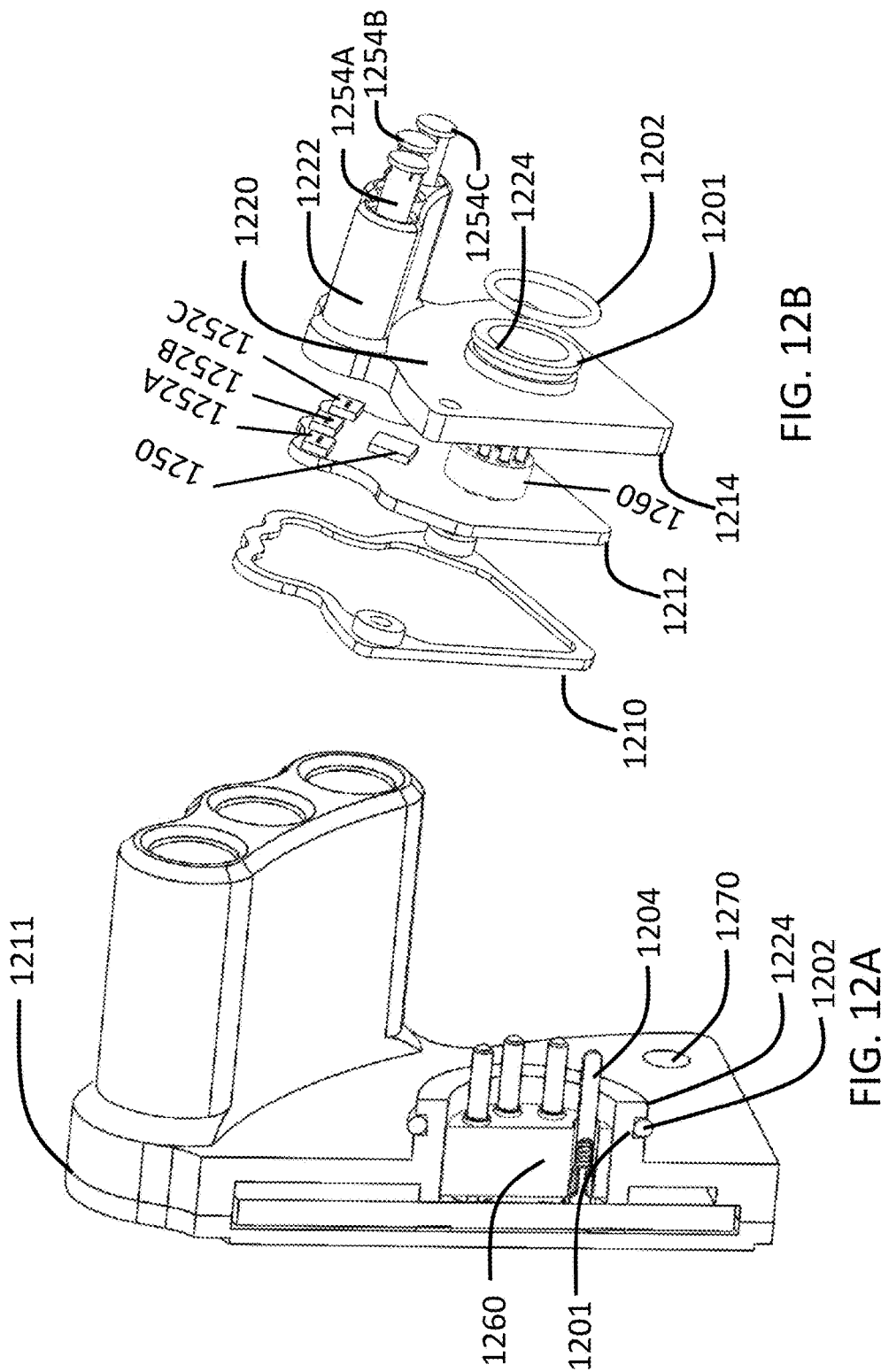

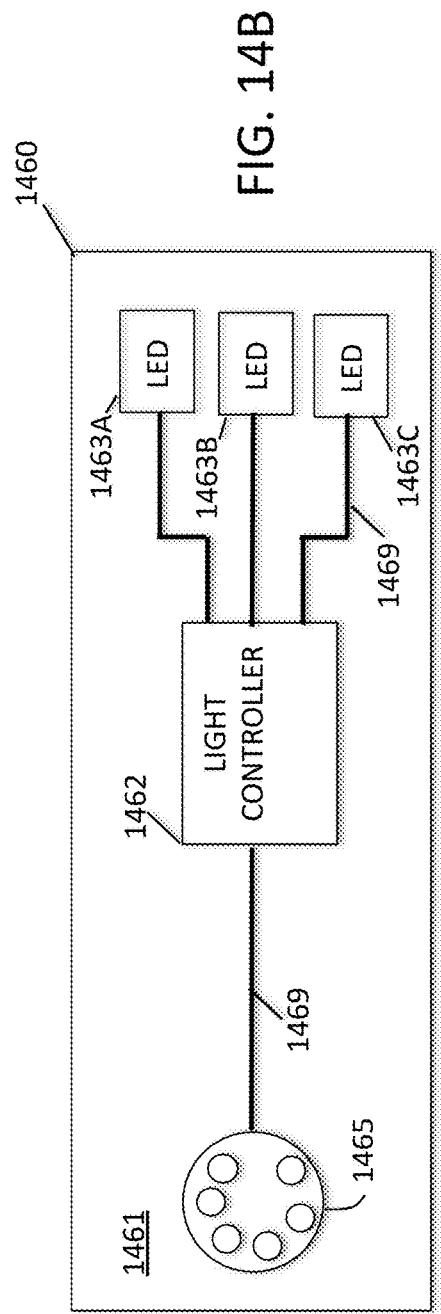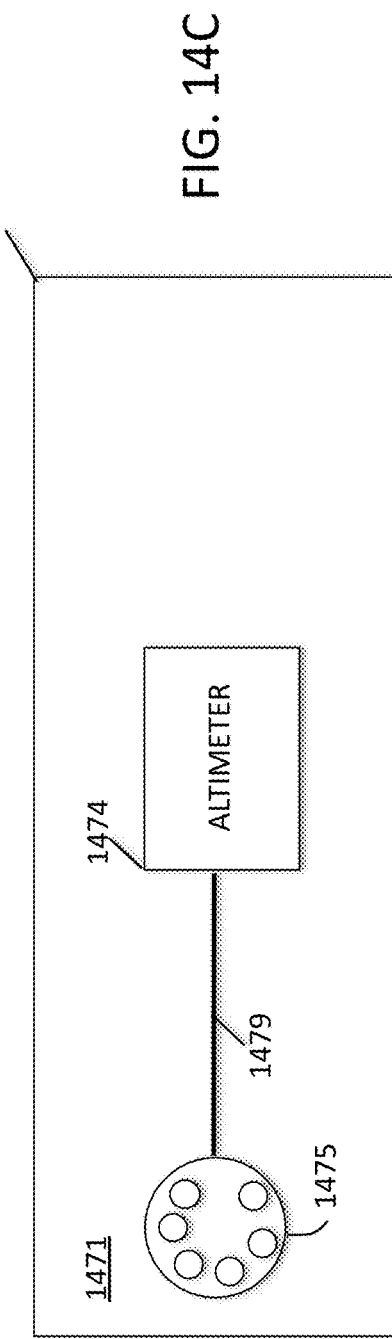

WATER RESISTANT SMART GAUGE

CROSS-REFERENCE TO RELATED APPLICATIONS

This non-provisional United States (U.S.) patent application claims the benefit of U.S. Provisional Patent Application No. 62/188,643; titled WATER RESISTANT SMART GAUGE; filed on Jul. 4, 2015 by inventors Todd Berk et al.; incorporated herein by reference.

FIELD

The embodiments relate generally to gauges, meters, instruments, and indicators for vehicles and tracking devices for motion/position tracking systems.

BACKGROUND

Controlling a user interface while wearing gloves is a challenge. It can be difficult to accurately select buttons of a user interface. It is even more difficult to select buttons when operating a motor vehicle with gloved hands.

The environment can be particularly harsh on electronic devices when they are exposed. Water can find its way through minute cracks in cases and cause terminals to corrode or electrical shorts if an electronic device is powered on.

Mounting electronic devices can be a challenge when there is no receptacle provided in a motor vehicle, such as a motorcycle. Oftentimes only a bar is provided, such as in a roll cage or a handlebar.

Making an electronic device flexible for various types of motor vehicles can be challenging, particularly when water resistance is desirable.

Conventional tracking devices are typically very application specific, contain limited or dedicated functionality. Moreover, conventional tracking devices often have a limited user interface that lacks an ability to interact and/or display information. Physical user interfaces of conventional tracking devices, if any, are often very poor or complicated. Their ability to convey information to users is often missing or lacking clarity. Furthermore, conventional tracking devices are often set in functionality and unable to be expanded or customized.

BRIEF SUMMARY

The embodiments of the invention are summarized by the claims that follow below.

BRIEF DESCRIPTIONS OF THE DRAWINGS

FIG. 1A is a front perspective view of the smart gauge.
FIG. 1B is an exploded view of the smart gauge.
FIG. 2 is a rear perspective view of the smart gauge.
FIG. 3 is a front view of the smart gauge.
FIG. 4 is a rear view of the smart gauge without expansion modules and power/data port cover being plugged into the ports of the rear cover.
FIGS. 5A-5B are perspective rear views of the smart gauge with an attached mounting bracket in one position.
FIGS. 5C-5D are perspective rear views of the smart gauge with the attached mounting bracket in different position.
FIG. 5E illustrates how the smart gauge 100 can be mounted to a bar.
FIG. 6 is sectional view through a center of the smart gauge.
FIG. 7 is a sectional view through a center of the smart gauge, with internal parts, features, and faces removed to better show the operation of the rotatable ring.
FIG. 8 is a sectional view through the smart gauge at the midpoint of the magnets 706 drawn parallel to the front pane 108.
FIG. 9 is a sectional view of the smart gauge through a center of the module ports without any expansion module inserted therein.
FIGS. 10A-10B are view of a touch pad printed circuit board of the smart gauge.
FIG. 10C is a front view of the smart gauge illustrating the touch pad buttons of the touch pad printed circuit board.
FIG. 11A is a perspective view of the smart gauge with a light expansion module ready for plugging into a module port.
FIG. 11B is a sectional view of the smart gauge through the center of module ports including a sectional view of a connected expansion module inserted therein.
FIG. 12A is a sectional view of the light expansion module shown in FIG. 11A.
FIG. 12B is an exploded view of the light expansion module shown in FIG. 11A.
FIGS. 13A-13B are perspective views of the smart gauge with a communication expansion module ready for plugging into a pair of module ports.
FIGS. 13C-13D are perspective views of the smart gauge with the communication expansion module plugged into a pair of module ports of the smart gauge.
FIG. 14A illustrates a functional block diagram of the electrical components within the smart gauge.
FIGS. 14B-14E illustrate functional block diagrams of accessory expansion modules that couple to the smart gauge and its main printed circuit board.
FIG. 14F illustrates an on board diagnostic module that can be coupled to and between the smart gauge and a wiring harness of a vehicle.
FIG. 15A illustrates motor vehicles racing on a race track in point to point wireless communication with a local computer system using the smart gauge with the communication expansion module.
FIG. 15B illustrates a two or more vehicles preparing to race or rally against each other from a start point or line to a finish point or line along a course or track.
FIG. 15C illustrates a pair of smart gauges in communication with each other and a pair of cameras.
FIG. 15D illustrates tracking of a terrestrial vehicle with a smart gauge.
FIGS. 16A-16C illustrate different user interfaces that may be displayed by the smart gauge with a turn of the user interface ring from one tick to the next.
FIG. 17 illustrates a airplane flying in wireless communication with one or more satellites and a computer system using the smart gauge with the communication expansion module.
FIG. 18 illustrates the smart gauge in local wireless communication with a smart cellular telephone and a remote wireless communication with a computer server over a cellular telephone network.
FIG. 19 illustrates a user interface application for a smartphone and tablet computer to manage and share data captured by the smart gauge.
FIG. 20 illustrates various wireless communication channels that may be made by the smart gauge to share information with a user and remotely control a smart phone.

DETAILED DESCRIPTION

In the following detailed description of the embodiments, numerous specific details are set forth in order to provide a thorough understanding. However, it will be obvious to one skilled in the art that the embodiments may be practiced without these specific details. In other instances well known methods, procedures, components, and circuits have not been described in detail so as not to unnecessarily obscure aspects of the disclosed embodiments.

The embodiments include methods, apparatus, and systems for a water resistant smart gauge. The smart gauge disclosed herein may be used for tracking movement, recording data, communication, and information display with respect to a motorized vehicle (e.g., plane, train, motorcycle, automobile), or a non-motorized vehicle (e.g., bicycle), or a human being partaking in sports (e.g., skier, snowboarder). The smart gauge is water resistant so that it can be exposed to outdoor environments, such as when mounted to a motorcycle, an off road vehicle, a skier, or a snowboarder for example. The smart gauge includes mounting recesses and an adaptable mounting bracket that can be reoriented in order to mount the smart gauge in different angular positions. The smart gauge includes a user interface, including a graphical user interface (GUI), as well as a rotatable ring and one or more touch pad sensors that a user can operate and select with a gloved hand.

Water Resistance

Figure 1A:
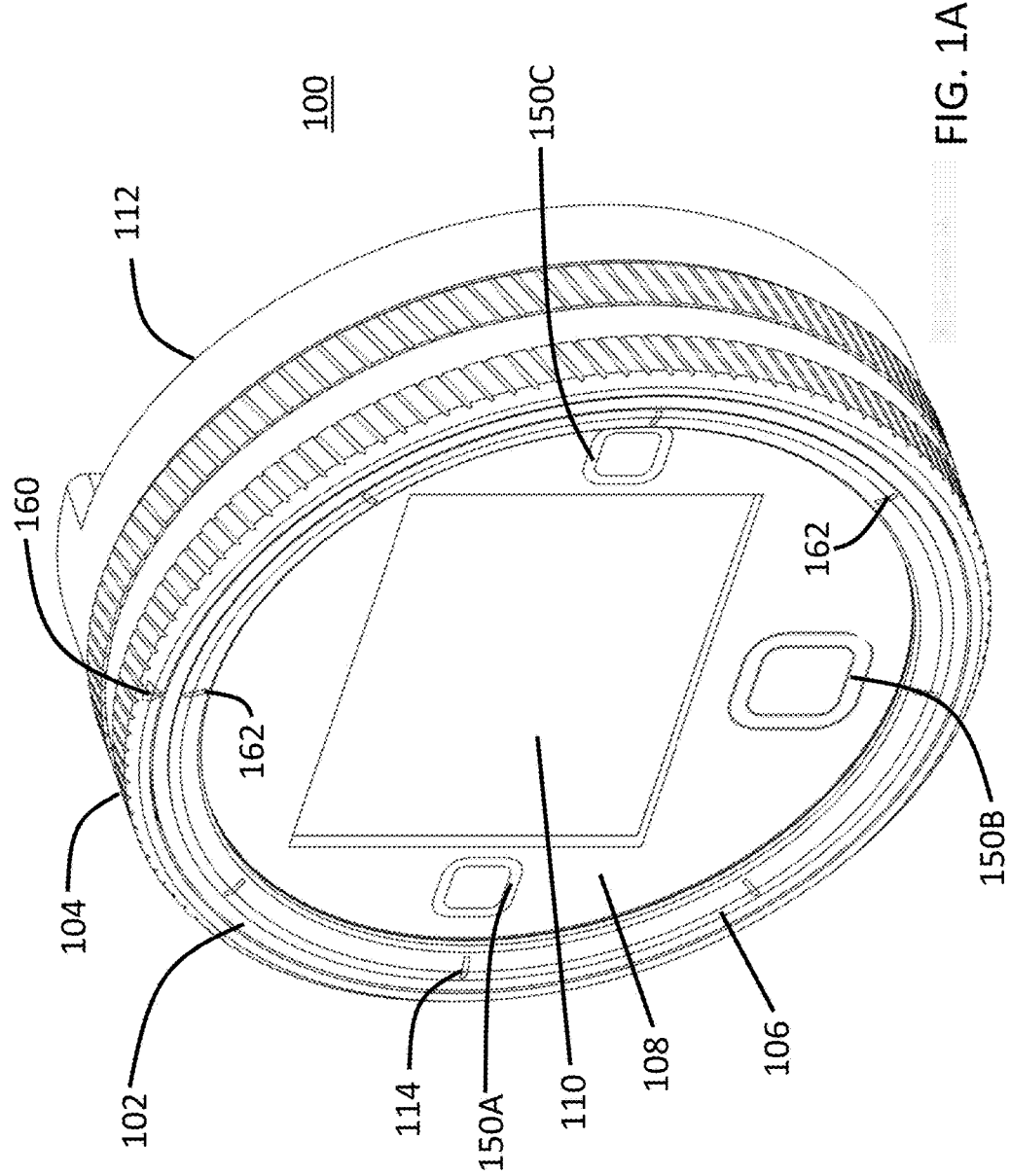
Figure 1B:
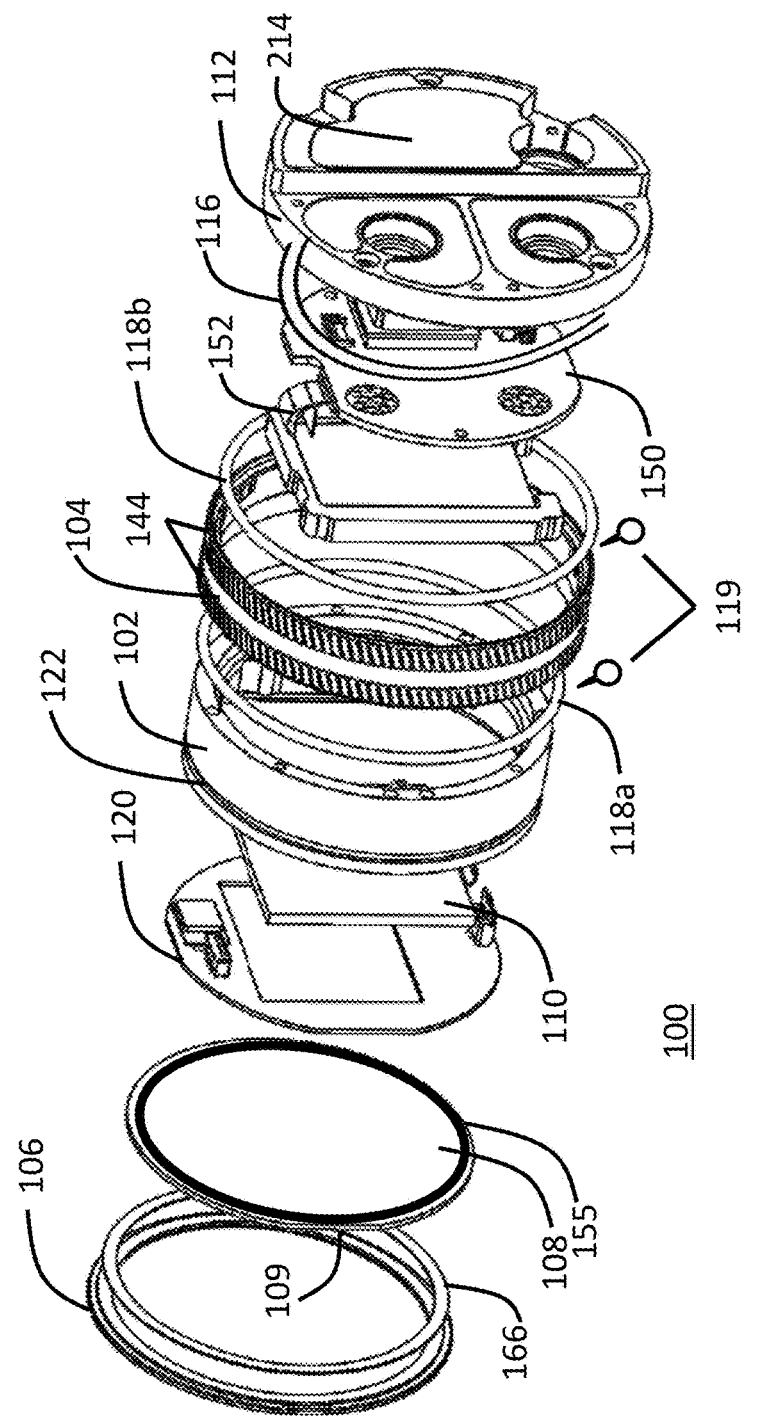
Figure 3:
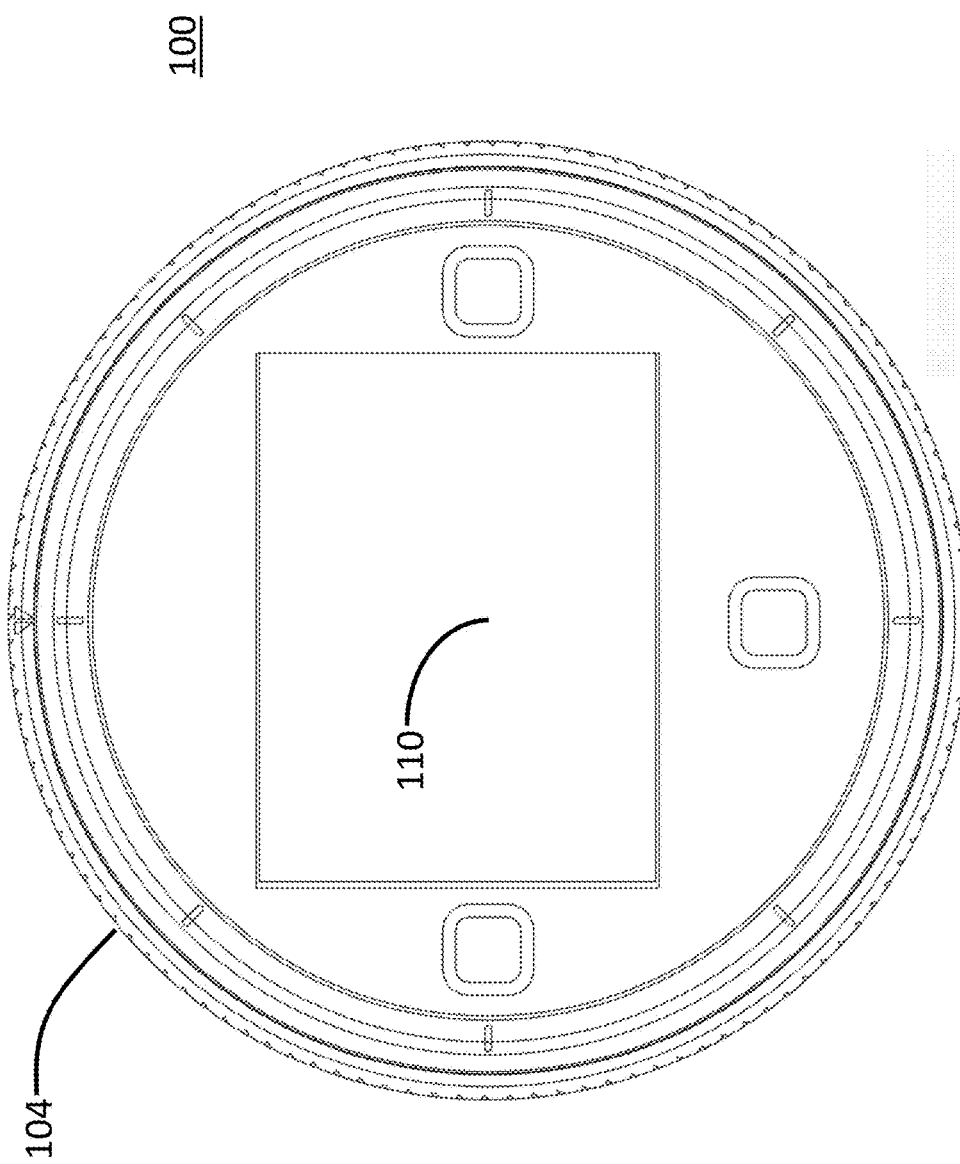

Referring now to FIGS. 1A-1B and 2, views of a smart gauge 100 are shown. The smart gauge 100 includes a hollow circular shaped housing 102 (better shown in FIG. 1B), an outer rotatable ring 104, a bezel 106, a transparent front pane 108, an electronic display device 110, and a rear cover 112. The smart gauge 100 further includes a main printed circuit board 150 to which electronic devices can be mounted and coupled together. The smart gauge 100 further includes a secondary printed circuit board 120 that includes touch sensitive buttons provided and connectors to which an end of the ribbon cable 152 can couple. The main printed circuit board 150 also includes a connector to which an opposite end of the ribbon cable 152 can couple. One connector of the secondary printed circuit board 120 is an edge connector to receive a small third printed circuit board to which one or more hall effect sensors are coupled.

The smart gauge 100 is water resistant using one or more rubber o-ring seals (e.g., o-ring seal 116 between the rear cover 112 and the housing 102) to protect the electronics found therein. The front transparent pane 108 is sealed to the housing 102 with an adhesive 155 to provide a water tight seal for the water resistant smart gauge. The ring shaped bezel 106 is coupled to the front transparent pane 108 with an adhesive 166. Accordingly, the smart gauge 100 can be mounted to a motor vehicle (e.g., a motorcycle) and left in the elements without fear of water shorting out the electronics or dust/dirt interfering with electrical connections.

The smart gauge 100 can be expanded with functional expansion modules or accessories while maintaining its water resistant nature. The smart gauge provides a water resistant coupling of the functional expansion modules into the module ports 204,206 to the smart gauge 100. For example, FIGS. 11A-11B, and 12A-12B illustrate a light expansion module 1100, for example. Other types of expansion modules may be inserted into the module ports 204,206, such as a communication module 1300 shown in FIGS. 13A-13D. The smart gauge 100 also provides a water resistant electrical connection to the expansion modules, such as the light expansion module 1100 and the communication module 1300 for example.

Figure 9:
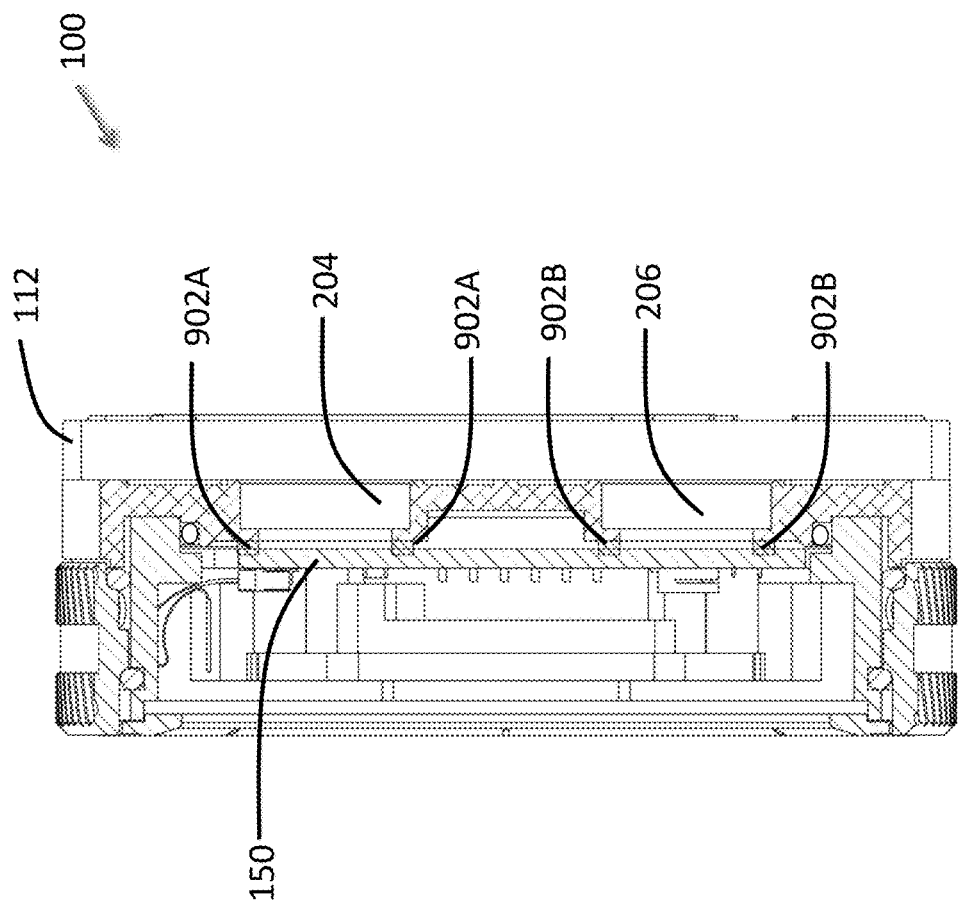
Figure 11B:
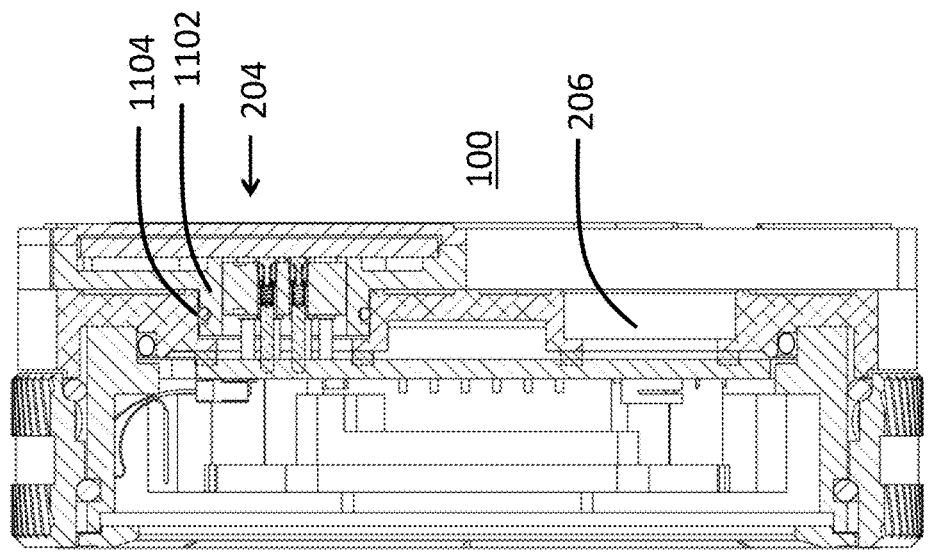
Figure 11A:
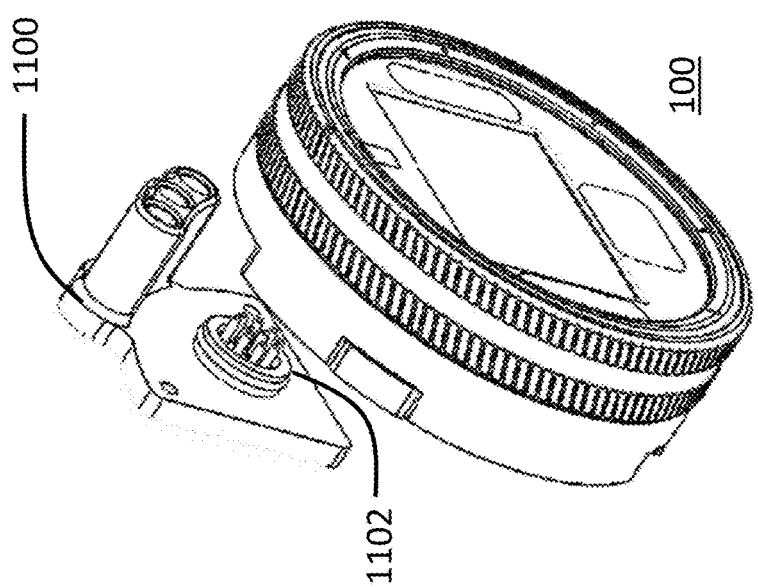

Referring now to FIG. 9, a sectional view of the smart gauge taken through the center of module ports 204,206 is shown without any expansion module inserted therein. FIG. 11B illustrates a sectional view of the smart gauge 100 taken through the center of module ports 204,206 with the light expansion module 1100 inserted into the module port 204.

Figure 4:
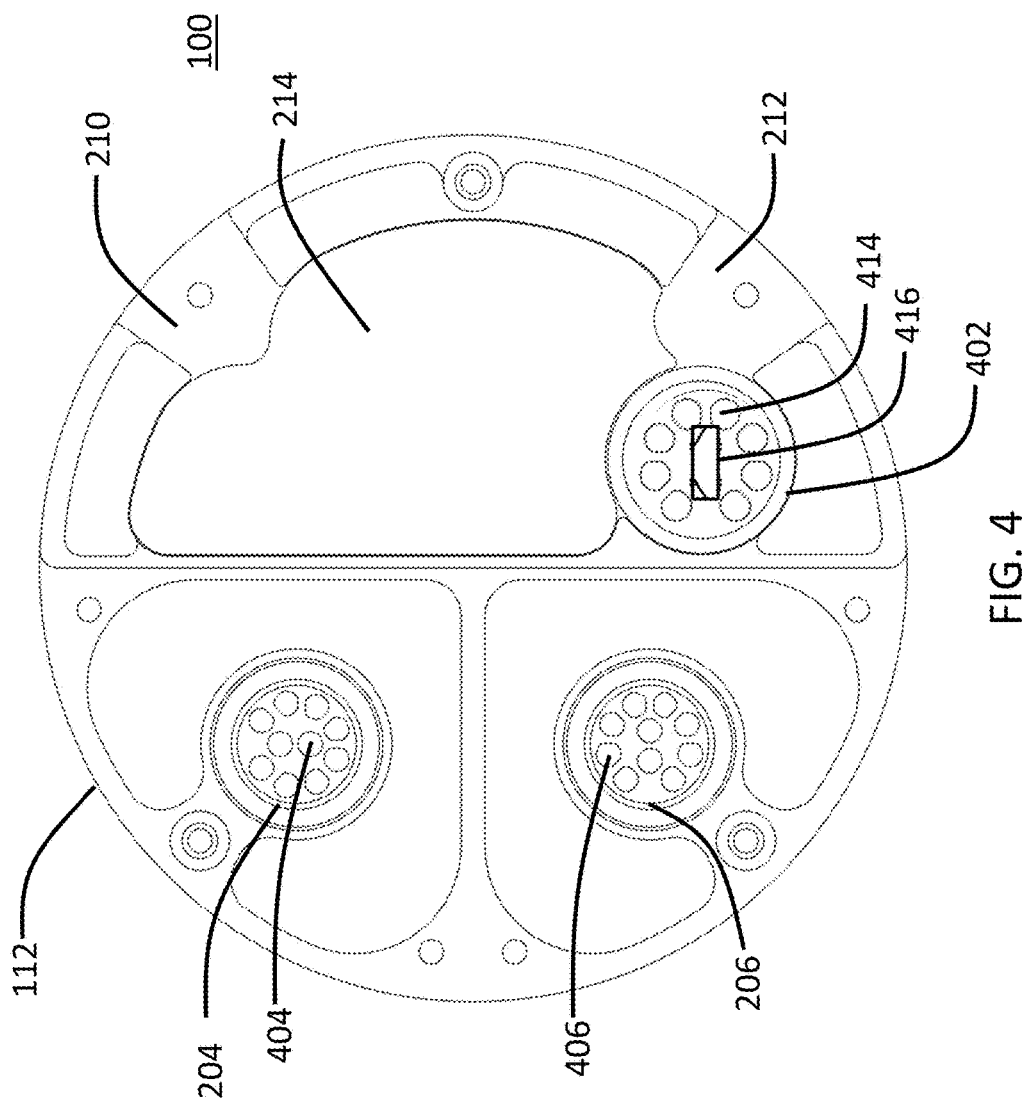

Referring momentarily to FIG. 4, electrical contacts 404, 406 are shown located on the rear side of the main PCB 150 for each module port 204,206. FIG. 2 illustrates a circular shelf 209A,209B around each module port 204,206 in the rear cover 112. In FIG. 9, between the rear cover 112 and the main PCB 150 is an inner port seal 902A,902B held in place by each circular shelf 209A-209B around each module port 204,206. The inner port seal 902A,902B prevents ingress of dust and/or water into the smart gauge 100. The contacts 404,406 are gold plated so they resist corrosion from moisture if the module ports are uncapped, unplugged, or without an expansion module.

As shown in FIGS. 12A-12B, the expansion module 1100 includes a rear module housing portion 1210, an expansion module printed circuit board 1212, a front module housing portion 1214, and a module o-ring seal 1202. The front module housing portion 1214 of each expansion module includes a base 1220 and a hollow cylindrical shaft 1224 extending from the base. Each cylindrical shaft 1224 includes a ring groove 1201 to receive a seal. The module o-ring seal 1202 is mounted into the ring groove 1201 of the hollow cylindrical shaft 1224. The light expansion module includes a light fixture 1222 extending from the base 1220 of the front module housing 1214.

When coupled to the smart gauge 100, the o-ring seal 1202 seals between the front module housing and the module port 204,206 of the smart gauge 100 to prevent the ingress of dust and/or water into the module port 204 and inner cavities of the smart gauge. As shown in FIG. 9, the cylindrical shaft 1224 of the front module housing 1214 of the expansion module 1100 protrudes into the module port 204.

A plug module (not shown) may be inserted into the module ports 204,206 when they are not used with an expansion module. The plug module also includes an o-ring seal 1202 mounted into the ring groove 1201 of a closed ended or solid cylindrical shaft extending from the base.

The expansion module 1100 itself is made water resistant by employing a water resistant sealant/adhesive 1211 along sealing edges between the rear module housing portion 1210 and the front module housing portion 1214. The rear module housing portion 1210 and the front module housing portion 1214 may be further coupled together by one or more fasteners. Each of the rear module housing portion 1210 and the front module housing portion 1214 may include one or more aligned openings 1270 to allow one or more fasteners (e.g., a screw) to pass through and couple the module to the smart gauge.

External and Internal Smart Gauge Structure

Figure 6:
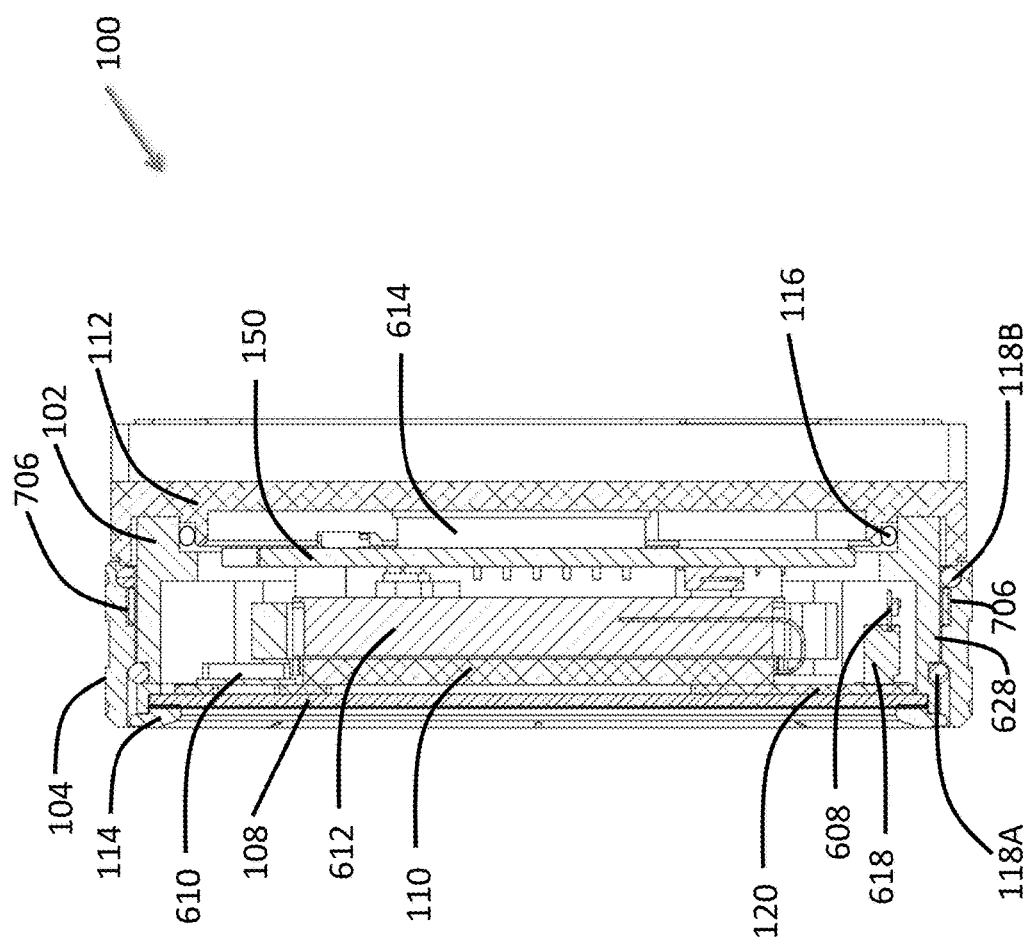

Referring now to FIGS. 1B and 6, further details of the structure of the smart gauge 100 are now described. An outer exposed structure of the smart gauge 100 includes the main housing 102, the rotatable ring 104, the front bezel 114, the transparent front pane 108, and the rear cover 112. The front bezel 114, the transparent front pane 108, and the rear cover 112 are coupled to the main housing 102 in a fixed manner. The rotatable ring 104 is pivotally or rotationally coupled to the main housing 102 between the front bezel 114 and the rear cover 112.

FIG. 6 illustrates the inner surface of the rotatable ring 104 resting on the o-ring bearings 118A-118B. It also illustrates how the o-ring bearings 118A-118B are retained in circular grooves in the main housing 102. As can be seen in FIG. 1B, the outer surface of the rotatable ring 104 includes one or more knurled gripping surfaces 144 that can be readily grasped by gloved fingers of a gloved hand to rotate the ring.

As shown in FIG. 6, a front or secondary printed circuit board (PCB) 120 is located behind the behind the circular shaped transparent front pane 108. The transparent front pane 108 may be formed of glass, mineral glass, plexi-glass, plastic, quartz crystal, sapphire crystal, etc.

The front or secondary printed circuit board (PCB) 120 includes wire traces and electronic circuits mounted to it and coupled together for touch detection of the touch sensitive buttons 150A,150B,150C and ring rotation sensing of the rotatable ring 104 of the user interface. The front or secondary printed circuit board (PCB) 120 further includes wire traces and electronic circuits mounted to it and coupled together for tracking and radio frequency communication between the smart gauge and base stations, other smart gauges, smart phones, tablet computers, and/or other electronic devices with wireless radios.

The front PCB 120 further includes a connector 618 mounted to it to receive an edge connector of a third PCB with one or more ring rotation sensors 608 mounted to it. The one or more ring rotation sensors 608 sense the magnets 706 as the rotatable ring 104 is turned.

A radio frequency module 610 is further mounted to the front PCB 120 and coupled to its traces. The radio frequency module 610 further includes one or more wireless radio receiver/transmitters for radio frequency communication with other electronic devices having wireless radios. In accordance with one embodiment, the radio frequency module 610 is a local limited range (e.g., Bluetooth) radio frequency module.

The main printed circuit board (PCB) 150 is mounted and secured to the main housing 102 by one or more fasteners. The main PCB 150 includes wire traces and connectors to couple functional components of the smart gauge together. A radio frequency module 614 is mounted to the main PCB 150. The radio frequency module 614 further includes one or more wireless radio receiver/transmitters for radio frequency communication with other electronic devices having wireless radios. In accordance with one embodiment, the radio frequency module 614 is a global positioning satellite (GPS) receiver that provides position tracking of the smart gauge in response to the received GPS satellite signals. One or more flexible connections (e.g., ribbon cables) may be used to couple functional components of the smart gauge together.

A battery 612 is mounted in the main housing 102 between the display device 110 and the main PCB 150. The battery 612 is a rechargeable battery that can be charged through a charger port and a charger connection. The battery provides power to the functional electronic components of the smart gauge. The user interface provides an on/off switching mechanism to switch the power from the battery on and off to the electronic components of the smart gauge.

Figure 14A:
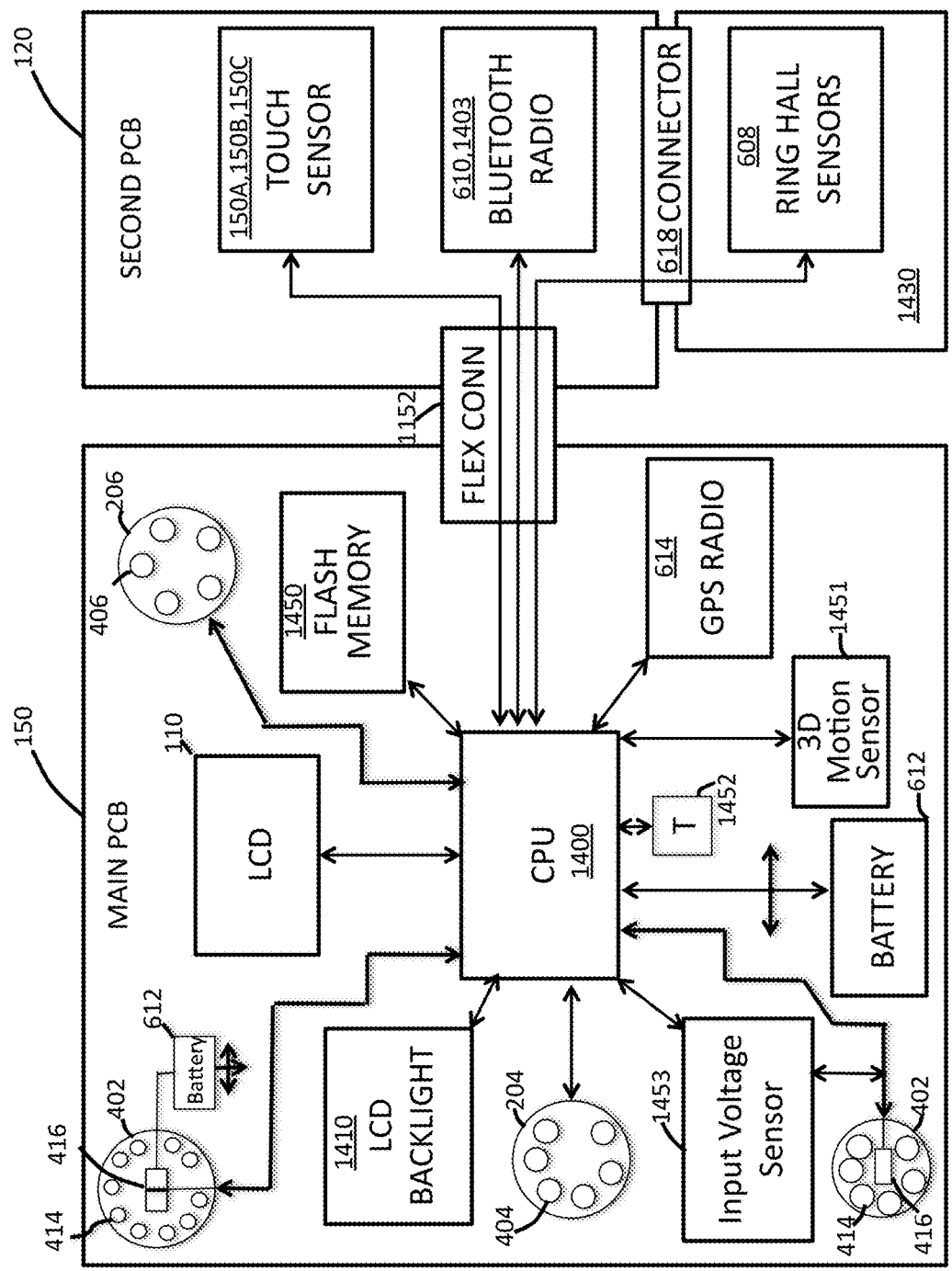

Referring now to FIG. 14A, a functional block diagram of the smart gauge 100 is shown. The electronics of the smart gauge 100 may be spread over the main PCB 150, the secondary PCB 120, and a third PCB 1430. The secondary PCB 120 is coupled to the main PCB 150 by a flexible connector 152, such as a ribbon cable, and a pair of sockets mount to each PCB. The third PCB 1430 is coupled to the secondary PCB 120 by a socket connector 618. An edge connector of the PCB 1430 is inserted into the socket connector 618 such that the PCB 1430 is perpendicular to the secondary PCB 120.

Mounted, coupled, or in communication with the main printed circuit board 150 are a processor 1400, a display device 110 (e.g. liquid crystal display LCD), a flash memory 1450, a global positioning system (GPS) radio 614, a three dimensional (3D) motion sensor 1451, a temperature sensor 1452, an input voltage sensor 1453, and a backlight 1410 for the display device 110. The main printed circuit board 150 includes wire traces to couple the electronic components in communication with the processor 1400 and a power supply that may be provided by the battery 612.

The main printed circuit board 150 further includes expansion ports 204,206 and a data/power port 402. The ports 204,206,402 may include a plurality of contacts 404, 406,414 formed in the main PCB 150. The data port may have a micro or mini USB connector 416. The USB connector 416 may be used to recharge the battery 612 and provide a wired data communication port.

The processor 1400 executes processor instructions that may be stored in the flash memory 1450 to perform the functions of the smart gauge 100, including the user interface displayed on the display device 110. Besides processor instructions of software, the flash memory 1450 may store user data as the smart gauge is used in an action sport to record performance data.

The temperature sensor 1452 records the temperature because it can have an affect on vehicle performance as well as personal performance. The GPS radio 614 provides position information of the smart gauge and the vehicle to which it is mounted. Furthermore, the GPS radio 614 can provide compass heading and also be used to determine performance information of a vehicle or body in motion. The GPS radio 614 may also provide some altimeter information if in communication with three or more satellites.

The 3D motion sensor 1451 includes three motions sensors that sense in three dimensions. The 3D motion sensor 1451 includes a three axis accelerometer, a three axis gyroscope, and a three axis magnetometer to provide nine axis of motion tracking. It can be used to measure and record performance information, including velocity, acceleration and gravitational-forces such as those experienced during vehicle acceleration, braking, and turning for example. With nine axis of motion tracking provided by the motion sensor 1451, the performance measurements and information can be more accurate.

With the processor 1400 keeping track of time, and receiving information from the GPS radio 614 and motion sensor 1451, performance information, tracking information, distance information, and heading information; performance metrics can be computed. Comparisons can be made between stored information and most recently recorded to compute performance difference between laps of a predetermined track.

The input voltage sensor 1453 is coupled to the battery 612 and the charging/data port connector 416 to measure the input voltage and the battery voltage. The varying measurements of battery voltage over time is provided to the processor 1400 by the sensor in order to compute remaining battery charge level (a battery fuel level) as the smart gauge is used. If a charging cord is plugged into the connector 416, the rechargeable battery 612 can be recharged and the processor 1400 may provide an estimated time to full charge in response to the change in battery voltage level sensed by the voltage sensor 1453. A charging cord can also provide power to the components of the smart gauge under regulation by the input voltage sensor.

The display device 110 displays the user interface of the smart gauge. The backlight 1410 is used to provide backlighting to make the graphics drawn on the display device visible, such in the evening for example when the sunlight is no longer provided.

Mounted, coupled, or in communication with the secondary printed circuit board 120 are the one or more touch sensors 150A-150C and a Bluetooth radio 1403. The Bluetooth radio is used to communicate with a user's cell phone, and other locally located devices with a Bluetooth radio that may be within range. For example, the smart gauge may be synchronized together with camera's on a vehicle having a blue tooth radio. A pair of smart gauges that may be located within a local range may be able to communicate and be synchronized together.

Mounted, coupled, or in communication with the third printed circuit board 1430 are the one or more ring hall sensors 608. The hall sensors 608 enable the ring user interface and sense pivoting of the ring 104 by magnets around its inner circumference.

The smart gauge 100 may receive a number of expansion or accessory modules with its ports 204,206. The electronic components of the expansion modules when plugged into the ports 204,206 are then coupled in communication with the main PCB 150 as an overall part of the smart gauge system.

Referring now to FIG. 14B, a functional block diagram of the light expansion module 1460 is shown. The light expansion module 1460 includes a light controller 1462, a plurality of laser emitting diodes or light emitting diodes (LEDs) 1463A-1463C, and a push pin connector 1465 (also referred to as a pogo stick connector) mounted to a printed circuit board 1461 and coupled in communication as shown by its wire traces 1469. The light controller 1462 receives power and control signals from the main PCB 150 to selectively turn on and off the LEDs 1463A-1463C. The spring loaded push pin connector 1465 couples to one of the ports 204,206 and its pins when the module is plugged into the smart gauge.

The LEDs may be controlled concurrently or sequentially controlled in time, in the color displayed, and whether blinking or not to alert a driver to certain events. The graphical user interface displayed by the display device can provide further information as to the type of alert that is being given clearly drawing the attention of the user to the smart gauge.

Referring now to FIG. 14C, a functional block diagram of an altimeter module 1470 is shown. The altimeter module 1470 includes an altimeter 1474, and a spring loaded push pin connector 1475 (also referred to as a pogo stick connector) mounted to a printed circuit board 1471 and coupled in communication as shown by its wire traces 1479. The altimeter 1474 senses barometric pressure changes so it may be used as a barometer to sense changes in weather pressure when there is little to no movement of the smart gauge. The spring loaded push pin connector 1475 couples to one of the ports 204,206 and its pins when the module is plugged into the smart gauge.

Figure 14D:
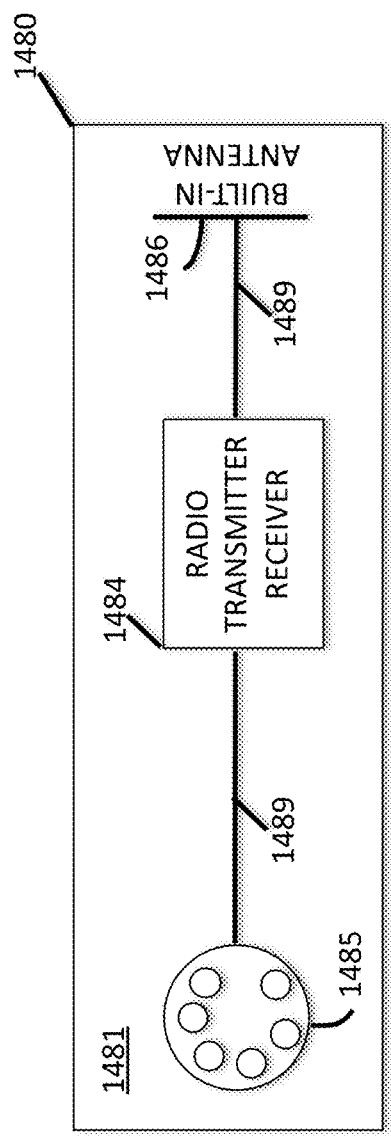

Referring now to FIG. 14D, a functional block diagram of a radio expansion module 1480 is shown. The radio expansion module 1480 includes a radio transmitter-receiver (transceiver) 1484, one or more built-in antenna 1486, and a spring loaded push pin connector 1485 (also referred to as a pogo stick connector) mounted to a printed circuit board 1481 and coupled in communication as shown by its wire traces 1489. The spring loaded push pin connector 1485 couples to one of the ports 204,206 and its pins when the module is plugged into the smart gauge.

Figure 14E:
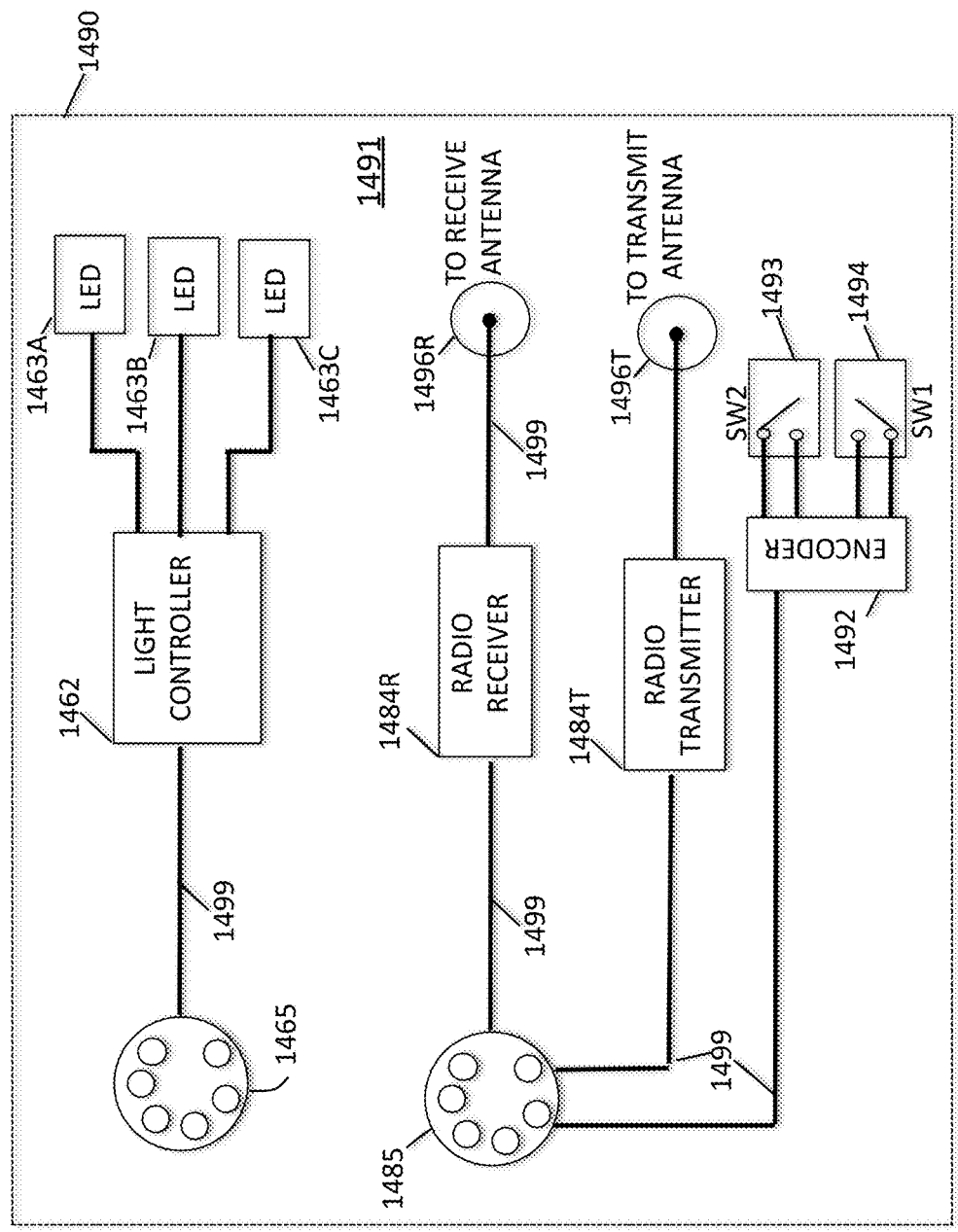

Referring now to FIG. 14E, a functional block diagram of an integrated expansion module 1490 is shown having multiple expansion functionality. The integrated expansion module 1490 couples to both ports 204,206 concurrently and includes the functionality of a light expansion module, a radio expansion module, and a switch expansion module. Mounted to a printed circuit board 1491 and interconnected by wire traces 1499, the integrated expansion module 1490 includes a light controller 1462, LEDs 1463A-1463C, a pair of push pin connectors 1465,1485, a radio transceiver 1484R, a radio transceiver 1484T, a pair of external radio frequency coaxial antenna cable connectors 1496R,1496T (e.g., BNC jacks), a switch encoder, and a pair of switches 1493,1494. The spring loaded push pin connectors 1465, 1485 couples to the ports 204,206 and its pins when the integrated expansion module 1490 is plugged into the smart gauge 100.

Figure 14F:
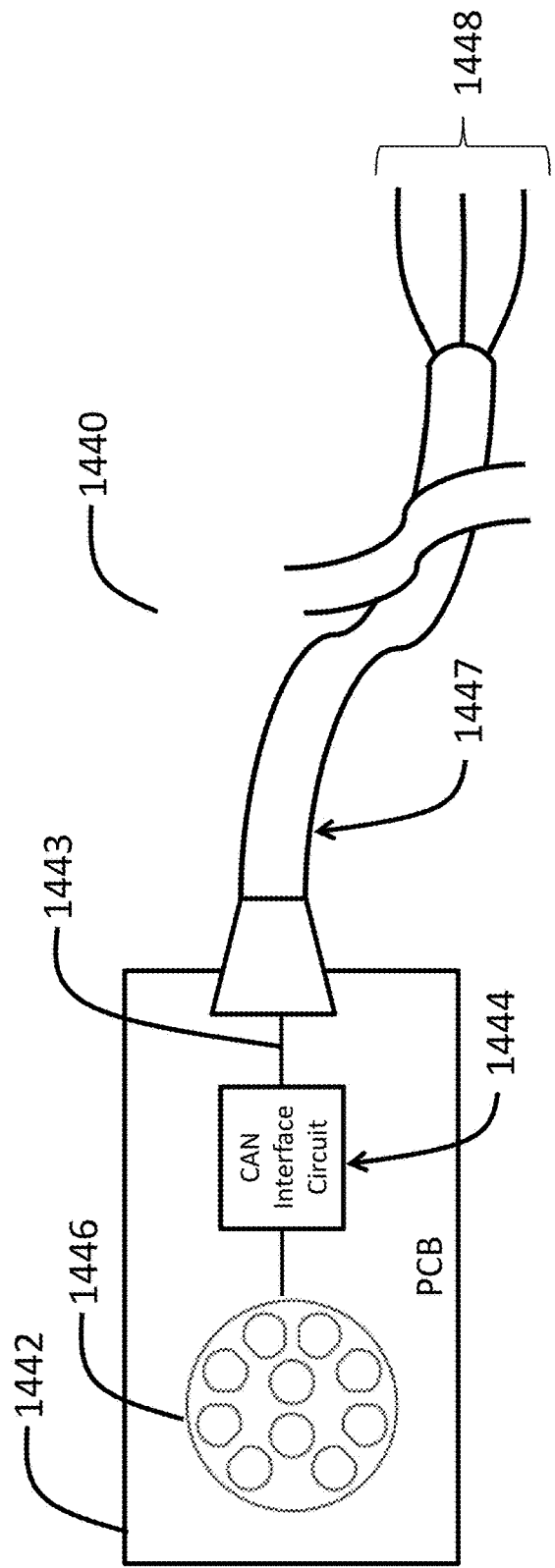

Referring now to FIG. 14F, an on-board-diagnostic (OBD)-controller area network (CAN) expansion module 1440 is shown. The OBD-CAN expansion module 1440 includes a printed circuit board 1442, plug 1446, cabling 1447, CAN interface circuitry 1444, interconnected wire traces 1443, and wiring harness interface wires 1448. The CAN interface circuitry 1444 translates signals between the CAN protocol and digital protocol to the CPU 1400. The wiring harness interface wires 1498 couple to various electronic interfaces of a vehicle, such as an on-board computer. The plug 1446 plugs into the port 402 or 406 of the smart gauge to couple vehicle data into the smart gauge 100 for recording, analysis, and display to the user.

The OBD-CAN expansion module 1440 can communicate real time data from a vehicle to the smart gauge 100, including diagnostic trouble codes indicating possible malfunctions of a vehicle. Performance data of a vehicle can also be coupled real time into the smart gauge by the OBD-CAN expansion module 1440 for recording, analysis, and display to the user.

Front Pane and Display

The electronic display device 110 is mounted in the housing 102 behind the front transparent pane 108. A backlight is mounted adjacent the electronic display device 110. The front or secondary printed circuit board 120 is mounted in the housing between the electronic display 110 and front pane 108. The front or secondary printed circuit board 120 further includes electronic circuits for touch detection. The transparent front pane 108 is printed with ink artwork to aesthetically cover the region surrounding the active area of display device 110.

The front pane 108 is formed of a transparent material, such as glass or plastic to be for the touch sensors to sense a finger touch. Alternatively, the front pane 108 may be formed of a combination of materials such as a metal or plastic material with transparent glass or plastic inserts over the active region of the display device 110 and touch sensors.

Generally the shape of the pane 108 is circular, but for a flat alignment edge 109 on one side as is shown in FIG. 1B. The circular shape with the flat alignment edge 109 of the pane mates with a similar shape in the housing 102 so that the ink artwork on the pane properly aligns with the housing 102, the touch sensors, and the display device 110.

Bezel 106 is attached to the front pane 108 and the main housing 102 by an adhesive ring 166. The bezel 106 provides an aesthetic cover and protection to regions of the front pane 108 that are connected to the internal main housing. The bezel 106 also features one or more visual index marks 114 and/or tick marks. The index marks 114 indicate the degrees of rotation of the rotatable ring to change to the next user interface.

Rotatable Ring User Interface

Figure 21:
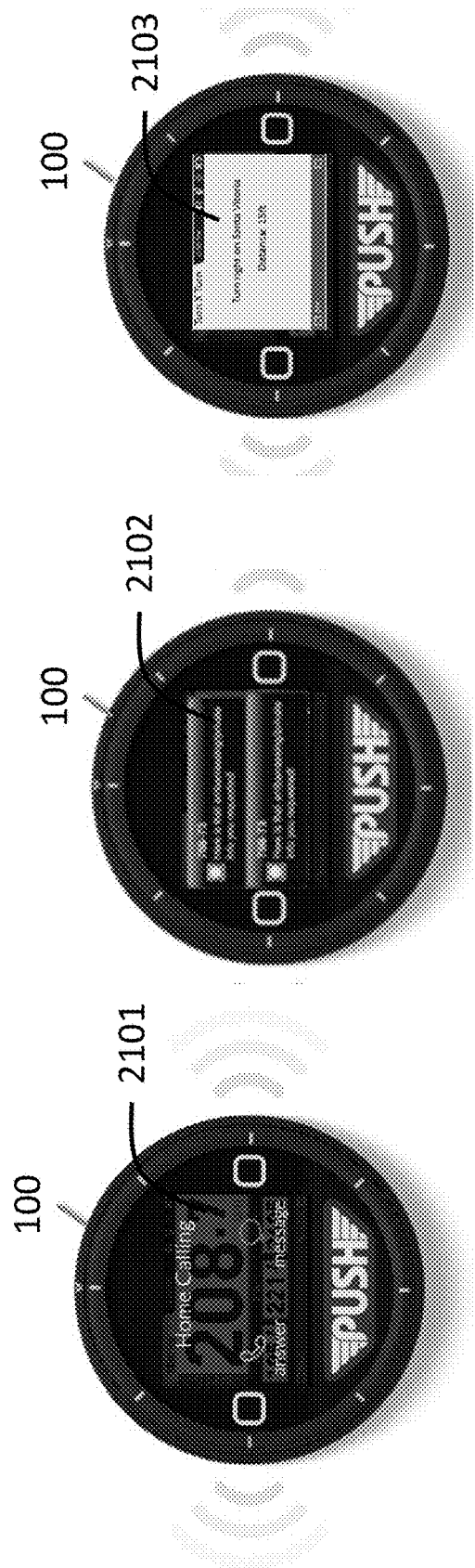
FIGS. 21A-21C illustrate differing user interface pages that may be displayed by the smart gauge with a turn of the user interface ring from one tick to the next.

Referring now to FIGS. 1A-1B and 6-7, a rotatable ring user interface system is now described. The smart gauge 100 includes the outer rotatable ring 104 that is rotatable about the housing 102. The outer rotatable ring 104 is used to select a user interface in a water resistant manner. A user deliberately rotates the ring 104 through a predetermined angle with reference to the housing 102 to select a different user interface to be displayed on the display device 100. For example, FIG. 21 illustrates three different user interfaces 2101-2103 that may be selected by the rotatable ring 104 at three different angular orientations.

As shown in FIG. 1A, the rotatable ring 104 includes an index mark 160 to visualize angular movement in the ring. The bezel 114 or front pane 108 includes a plurality of tick marks 162 spaced apart from each other at predetermined angles. The tick marks 162 may be used to indicate an angle of rotation of the ring 104 in which the smart gauge changes from one user interface to another. Rotating the ring 104 through three-hundred-sixty (360) degrees can call back up the same user interface for display by the display device. In one embodiment, there are eight (8) tick marks around the bezel 114. In which case, the smart gauge 100 may be programmed to change the user interface every forty-five (45) degrees. In other embodiments, more or less tick marks (N) may be used and the smart gauge programmed to change the user interface for each predetermined angle (N/360 degrees) of rotation of the ring.

As a vehicle or user moves, a user does not want vibrations to cause the ring 105 to freely rotate on its own from one user interface to another. It is desirable to maintain the same selected user interface until the user rotates the ring over the predetermined angle to manually select the next user interface.

Figure 7:
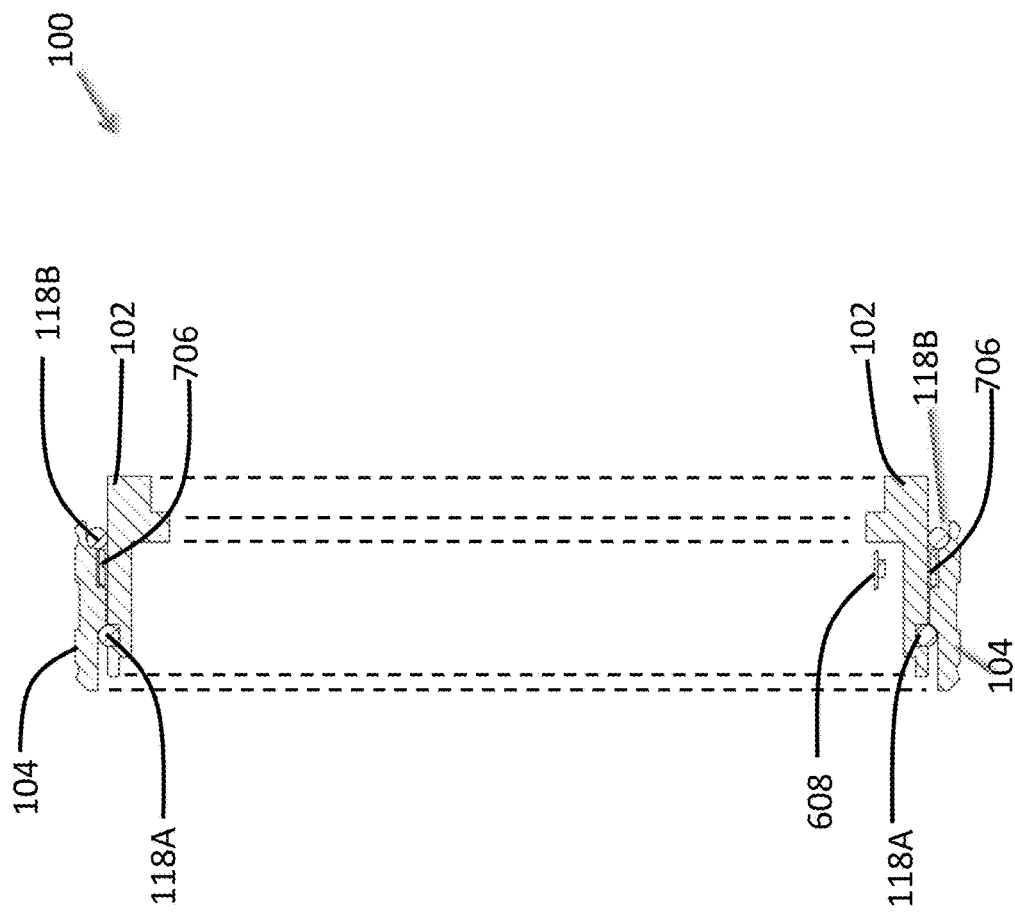

As shown in FIGS. 1B and 6-7, a pair of rubber ring bearings 118A-118B are used with a viscous damping substance 119 to provide rotational friction bearings for the rotatable ring 104 about the housing 102. The viscous damping substance 119 is a viscous damping fluid, gel, or grease that creates a friction so that the ring 104 does not freely spin about the housing 102, inadvertently changing from one user interface to another. A user deliberately rotates the ring 104 through the predetermined angle with reference to the housing 102 to select a different user interface.

As shown by the sectional views of FIGS. 6-7, the rotatable ring 104 rests upon the front O-ring bearing 118A and the rear O-ring bearing 118B. The radius of the front O-ring bearing 118A and the rear O-ring bearing 118B differ slightly. Before assembly, a film of the viscous damping substance 119 is placed on the O-ring bearings 118A-118B and a portion of an inner surface of the rotatable ring 104 and an outer surface of the main housing 102 to rest in a gap 618 there-between. The viscous damping substance 119 provides a smooth operation of the rotatable ring 104 during its rotation around the housing 102.

When the outer rotatable ring 104 is rotated through a predetermined angle from one tick to another, one or more control signals are generated to change user interfaces, change pages, information, and/or settings within a user interface screen. To further the water resistance of the smart gauge 100, the outer rotatable ring 104 generates these control signals within the housing without making an electrical connection between contacts. A magnetic field instead is used to generate the control signals within the housing 102 in response to an angular rotation of the ring 104 through the predetermined angle.

In order to generate control signals, the outer rotatable ring 104 includes one or a plurality of small magnets 706 coupled at points around its inner cylindrical surface. The plurality of small magnets 706 divide a circle into a plurality of predetermined angles. At least one ring rotation sensor 608 is mounted in the housing 102 near its inner surface to sense the magnetic field of each small magnet 706 as each nears the sensor during rotation of the ring 104.

The ring rotation sensor 608 comprises one or more magnetic field sensors (often referred to as a hall sensor) which generate electrical signals proportional to the magnetic field that it senses. In one embodiment, the ring rotation sensor 608 is comprised of a single magnetic field sensor. In this case, a plurality of small magnets 706 are coupled at points around the inner cylindrical surface of the ring 104. The single magnetic filed sensor detects the strength of the magnetic field and generates either a proportional signal, or a discrete signal based on the proportional signal exceeding a defined threshold. In other embodiments, the ring rotation sensor 608 is comprised of a plurality of magnetic field sensors. In this case, one or two small magnets 706 may be used to generate control signals with each of the plurality of magnetic field sensors.

The plurality of magnetic field sensors may biased in different directions to enable sensing of the magnetic field in multiple directions. In yet another embodiment, the ring rotation sensor 608 is comprised of multiple sensors spaced apart from one other around the inner surface of the housing to sense the magnetic field from each small magnet at multiple points.

Figure 8:
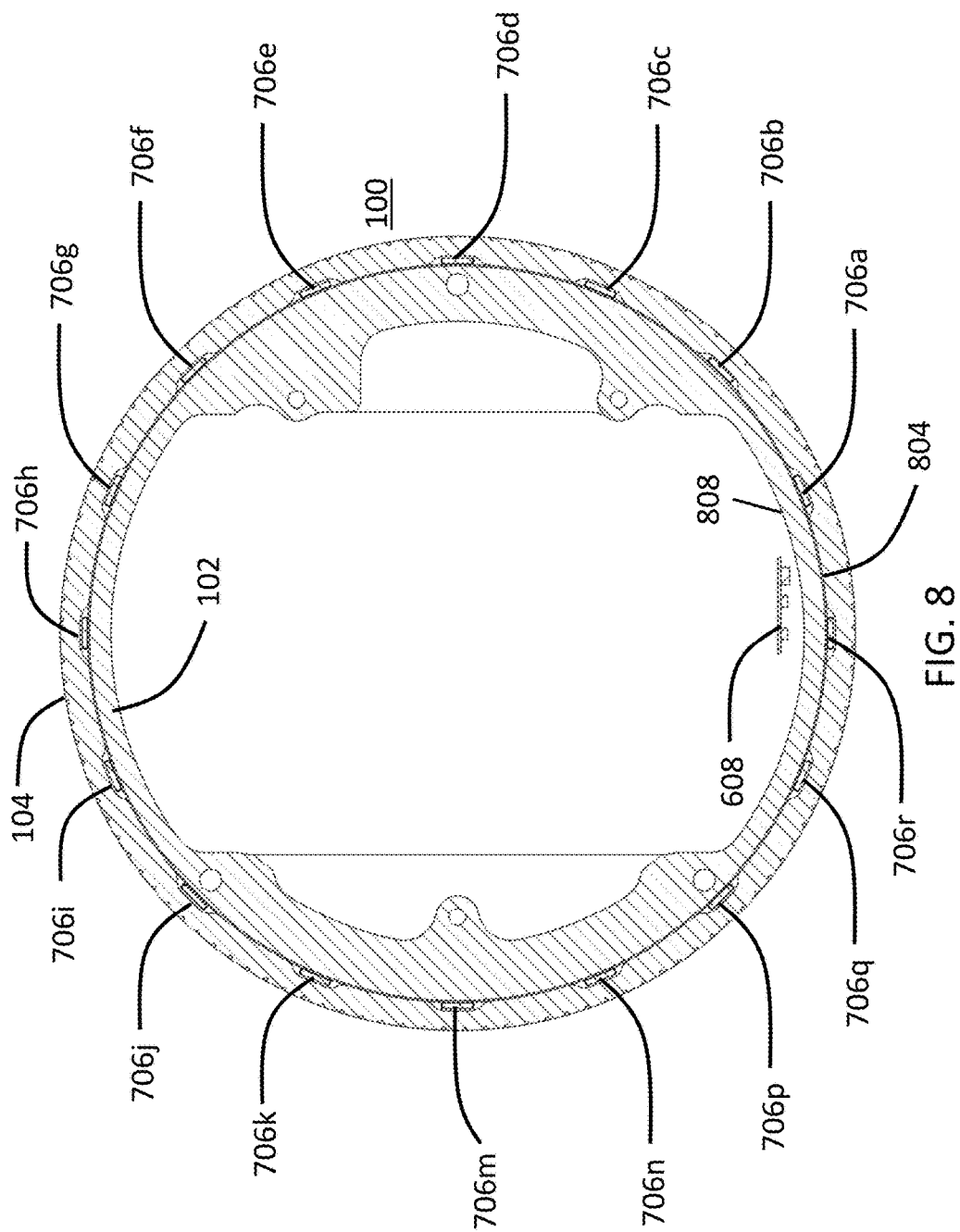

Referring now to FIG. 8, a cutaway sectional view of the smart gauge 100 is shown to illustrate one embodiment. The inside surface 804 of the outer rotatable ring 104 includes a plurality of pockets 806A-806R to receive a plurality of small magnets 706A-706R at predetermined points. The location of small magnets 706A-706R at the predetermined points may be associated with the location of the ticks and the index mark shown in FIG. 1A. The small magnets 706A-706R are fastened to the ring 104 in the respective pockets 806A-806R with an adhesive. The ring rotation sensor 608 is mounted inside the main housing 102 near its inner surface 808. As shown in FIG. 6, an edge connector of the printed circuit board of the ring rotation sensor 608 is plugged into a socket 618 that is in turn coupled to the secondary printed circuit board 108.

The magnets 706 being permanent magnets generate a constant low level magnetic field. As the rotatable ring 104 is rotated, the magnets 706 and their respective magnetic field move circumferentially with the rotatable ring 104. As the magnets rotate with the ring 104, the magnetic filed can be sensed as it becomes closer to the ring rotation sensor 608.

To identify a magnet 706A associated with the index mark, its polarity may be reversed from that of the other magnets 706A-706R around the ring 104. An additional magnetic field sensor may be used to better sense different polarities of the magnets.

Touch User Interface

Referring now to FIGS. 10A-10C, the smart gauge 100 includes three touch sensor buttons 1050A-1050C located around and near the display device 110 forming a touch user interface. The touch user interface of the smart gauge is designed to be an intuitive and non-distracting interface while a user participates in activities such as operating a vehicle (e.g., motorcycle riding, auto racing) or participating in a sporting event (e.g., snowboarding, snow skiing).

The number of touch zones of the touch user interface is limited to a few (e.g., three or four) well distinguished areas of the front transparent pane 108. Accordingly, a user can quickly provide a user input with minimal dexterity in comparison with that of a typical smartphone touch screen. The touch zones are extremely sensitive and designed to recognize taps of a user's finger covered by a thick glove.

In accordance with one embodiment, three touch pad sensors 1050A,1050B,1050C are spaced apart from each other around the display device 110 to avoid sensing errors. Furthermore, the one or more touch pad sensors 1050A, 1050B,1050C are sized appropriately to sense the touch of a finger through a thick glove, such as a motorcycle glove or fire retardant racing gloves for example. With a thick glove, the touch pad sensors 1050A,1050B,1050C have a greater surface area than otherwise needed to sense a bare finger and a fine point.

The touch pad sensors 1050A,1050B,1050C are mounted to the front or secondary printed circuit board 120 such as shown in FIGS. 10A-10B. The secondary printed circuit board 120 and the touch pad sensors 1050A,1050B,1050C are mounted in the housing of the smart gauge 100 under the transparent front pane 108 for water resistance as well.

Referring now to FIGS. 10A-10B, behind the front transparent pane 108 sealed to the housing 102 of the smart gauge 100 is a secondary PCB 120, which may also be referred to as a capacitive touch PCB. The secondary PCB 120 includes three large capacitive touch sensitive buttons 1050A-1050C that are extremely sensitive and designed to recognize taps of a finger that is insulated by thick glove fingers of a glove.

Generally the shape of the secondary PCB 120 is circular, but for one or more flat alignment edges 1060A-1060C on one or more sides, display opening 1061, and alignment opening 1062. The circular shape with the one or more flat alignment edges of the PCB 120 mates with a similar shape in inner surface of the hollow housing 102 so that the PCB properly aligns with the housing 102, and the display device 110. The display opening 1061 allows pixels of the display device 110 to be viewable. The alignment opening 1062 may mate with a peg 1064 in the housing 102 for further alignment as shown in FIG. 10C.

In another embodiment, touch pad sensors 1050A,1050B, 1050C and its circuits are incorporated in the transparent front pane 108. In yet another embodiment, the touch pad sensors 1050A,1050B,1050C are formed with a printed circuit surrounding the display. In alternate embodiments, the touch pad sensors 1050A,1050B,1050C and its circuits are split up and mounted onto a plurality of printed circuit boards.

As shown in FIG. 1A, the transparent pane 108 includes ink artwork 150A,150B,150C indicating a location to the user where to touch the front transparent pane 108 and respectively activate the touch pad sensors 1050A,1050B, 1050C. The ink artwork 150A,150B,150C may not be needed if advanced instructions are provided to the user of where to generally touch the front transparent pane 108 to activate the touch pad sensors 1050A,1050B,1050C. Alternatively, the ink artwork may be placed on a separate object or cover (not shown) and located behind the front transparent pane 108.

The touch pad sensors 1050A-1050C under the artwork 150A,150B,150C may operate contextually in response to the graphical user interface (GUI) being displayed by the processor and the display device 110. The ring and ring sensor may be used to select the graphical user interface that is displayed by the smart gauge on the display device. For example, different ring positions may select the different graphical user interfaces shown in FIGS. 16A-16C.

Figure 22:
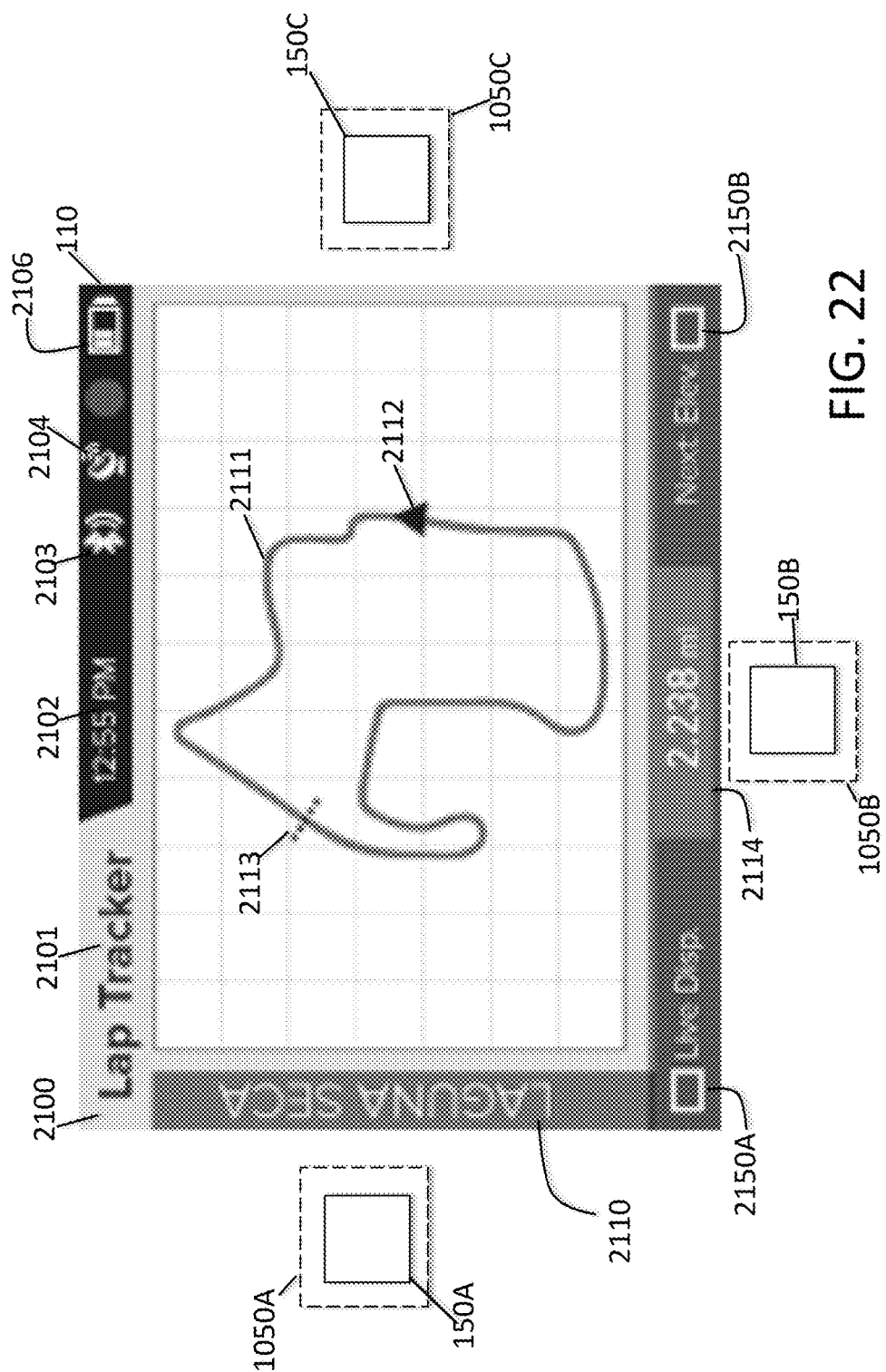
FIG. 22 illustrates an example graphical user interface that may be displayed by the smart gauge on its display device.

Referring now to FIG. 22, a ring position of the ring may be sensed by the ring sensor to display a graphical user interface (GUI) 2100 on the display device 110. The GUI 2100 includes a function title 2101 (e.g., lap tracker), local time 2102, blue tooth radio activity icon 2103, a tracking icon 2104, and a variable battery level icon 2106 across the top. On a left side of the GUI, a track name 2110 may be displayed. Across the bottom of the GUI, a left button function 2150A, a performance measure 2114 (e.g., miles driven), and a right button function 2150B may be displayed.

The center of the GUI shows a track map 2111 and on the track map, a track vehicle position icon 2112, and a start/finish line icon 2113. The track vehicle position icon 2112 illustrates the position of the vehicle on the map as it moves around the track. The start/finish line icon 2113 on the map is the position of the smart/finish line on the track. This gives a driver perspective as to his/her position on the track with respect to the start/finish line.

The left and right button functions displayed are contextual in response to the type of GUI being displayed. The left button function 2150A displayed corresponds to the function that the touch pad sensor 1050A under the artwork 150A performs. The right button function 2150B displayed corresponds to the function that the touch pad sensor 1050C under the artwork 150C performs. Pressing a finger against the pane over the touch pad sensor 1050A can select a live display of the track, for example. Pressing a finger against the pane over the touch pad sensor 1050C can select a next elevation of track, for example. These functions are contextual and can change from one GUI to the next GUI displayed by the display device 110 of the smart gauge 100.

Mounting

Referring now to FIG. 2, the rear cover 112 contains two mounting bracket receptacles, a top mounting bracket receptacle 210 and a bottom mounting bracket receptacle 212, each including a fastener opening 250, such as a female screw thread, and a bracket recess 252. The top mounting bracket receptacle 210 and the bottom mounting bracket receptacle 212 are provided at different angles from center so that it can be mounted nearer a top side or alternatively nearer the bottom side of the smart gauge. Furthermore, the bracket recess 252 in each of the top mounting bracket receptacle 210 and the bottom mounting bracket receptacle 212 are each symmetrical. The symmetry in the bracket recess 252 of each mounting bracket receptacle 210,212 allows a mounting bracket to be oriented in different directions from the same receptacle.

Referring now to FIGS. 5A-5B, a mounting bracket 502 is mounted to mounting bracket receptacle 212 in the rear cover 112. In FIGS. 5A-5B, the mounting bracket 502 is oriented so that it is arranged in a vertical orientation. In FIGS. 5C-5D, the mounting bracket 502' is oriented so that it is arranged in a horizontal orientation.

The mounting bracket 502 includes a mounting base 512 with a fastener opening 513 and an angled mounting fork 514 coupled to the base 512 on an angle A. Each tine of the angled mounting fork 514 includes a fastener opening 516 so that a fastener (e.g., a nut and bolt) may be used to couple the smart gauge to a base mount coupled to a bar or other structure of a vehicle (e.g., see bar 590 of FIG. 5E). A fastener 523 is inserted through the opening 513 in the bracket 502 and coupled into the fastener opening 250 of the rear cover.

The symmetry in the bracket recess allows the mounting bracket 502 to be flipped or reversed to achieve a different mounting orientation 502'. Furthermore, the mounting bracket 502 may be mounted into either of the different mounting bracket receptacles 210,212. The different mounting orientations 502,502' and the different mounting bracket receptacles 210,212 are advantageous so the smart gauge 100 can be adapted to different mounting scenarios at angles of 0, 90, 180, and 360 degrees from vertical.

While a single bracket 502 is shown being used in FIGS. 5A-5D, a pair of mounting brackets 502 may be used with each being fastened to the rear cover 112 and the mounting bracket receptacles 210,212. In other embodiments, a different type of mounting system (e.g., Velcro fabric fastener with ring loops) may be used with the smart gauge 100 without a mounting bracket receptacle. Furthermore, the mounting bracket receptacles could be formed at different locations or angles in the rear cover to accommodate different mounting angles and positions.

Figure 5E:
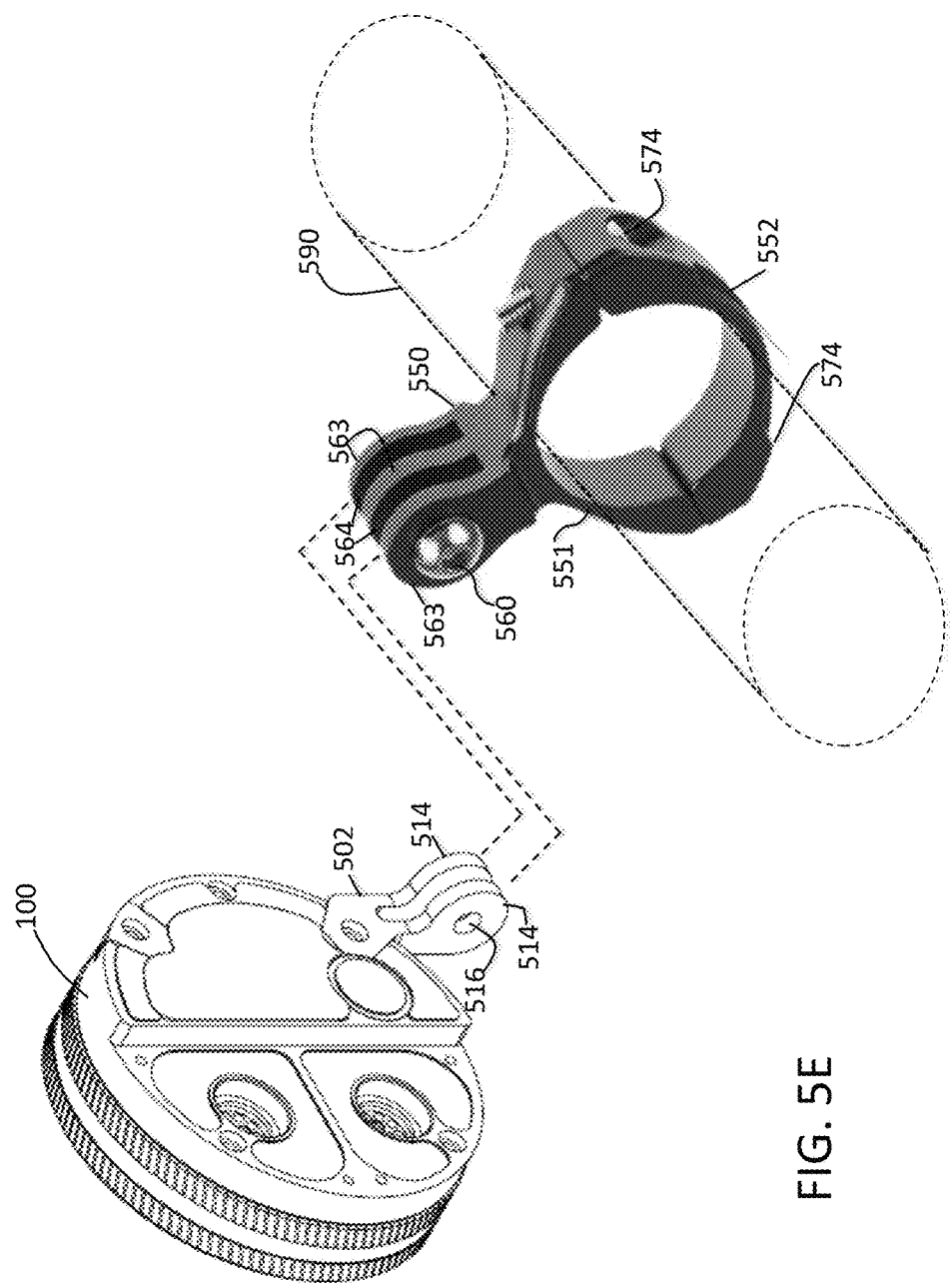

Referring now to FIG. 5E, the mounting bracket 502 can be used to mount the smart gauge 100 to a cylindrical bar 590 such as handle bars on a bike or motorcycle or roll bars of a race car. A bar mounting bracket 550 includes three tines 563 forming a pair of openings 564 to receive the tines of the mounting fork 514. The fastener opening 516 in the bracket 502 aligns with a fastener opening in the bracket 550. The threaded fastener 560 is inserted through the fastener openings in each and is threaded into a threaded opening on the opposite side such as found in a threaded nut or threaded opening in the tine 563.

The bar mounting bracket 550 includes a top half 551 and a bottom half 552 that sandwich the bar 590. A pair of threaded fasteners 574 are inserted through openings in the bottom half 552 and into threaded openings in the top half. The threaded fasteners are tightened with a wrench to clamp onto the bar.

Power and Communication

The outer ring 104 and main housing 102 of the smart gauge 100 may be formed of metal to be ruggedized for outdoor exposure and resistant to damage if dropped. The smart gauge includes a number of internal antennas mounted in the housing 102, such as found in the communications module, to transmit and receive wireless radio signals. An external expansion communication module may provide an additional wireless radio with external antenna connections to transmit and receive wireless radio signals. Metal in the smart gauge is not conducive to wireless radio communication.

Referring now to FIGS. 2 and 4, the rear cover 112 of the smart gauge 100 includes an RF window 214 through which wireless radio signals can pass. The RF window 214 is transparent to radio frequency (RF) signals that are to be transmitted and received by the internal antennas and wireless radios, such as the GPS and Bluetooth radio frequency modules 614,610. The RF window 214 is transparent to WIFI, cellular, Bluetooth, GPS, and 900 Mhz radio frequency signals for example, that are to be received or transmitted by internal antennas and radio receiver transmitters.

In another embodiment, internal antennae for the radios may be located near the front of the smart gauge to pass through the front transparent pane 108. The smart gauge may be reconfigured so that rear facing radio frequency devices are avoided to eliminate the need for the RF window 214 in the rear cover. In another embodiment, the smart gauge may provide external antennas that are external to the housing so that wireless radio signals can be readily received and transmitted. In another embodiment, external antenna connections may be provided by the smart gauge or one of its expansion modules.

The smart gauge 100 includes a battery 612 mounted in the housing that is rechargeable. It is desirable to provide a water resistant charging port in the smart gauge so that the battery 612 can be recharged. Moreover, it is desirable to also provide a wired data port for the smart gauge 100 to retrieve data stored in its memory for example. The wired data port may also be used to service, maintain, and upgrade software instructions executed by the processor in the smart gauge.

Referring now to FIG. 2, the rear cover 112 of the smart gauge 100 includes a data and power port cover 216 including a groove with a o-ring seal to provide a water resistant seal. The cover 216 further protects data and/or power connectors of the smart gauge. When the cover 216 is removed, access is provided to the power connector to power the smart gauge without a rechargeable battery and/or charge the rechargeable battery 612 of the smart gauge. Access is also provided to a data connector or the date connections under the cover 216 to exchange data with the smart gauge using a wired cable. The power and data connection may be provided by one or more connectors/connections.

Referring now to FIG. 4, the back side of the smart gauge 100 is shown with the data/power port cover 216 unplugged from the data/power port 402 in the rear cover 112. In accordance with one embodiment, the wired power and data connection is concurrently provided by a connector 416 mounted to the main PCB 150 and coupled to its traces.

The connector 416 may be a standard USB connector, such as a female micro USB connector. In alternate embodiment, the wired power and data connection is concurrently provided by a plurality of pads 414 and a power module, similar to the connection provided by expansion modules to the pads 404,406 of the PCB 150. In other embodiments, other known power and/or data interfaces may be used to provide power/charge and data communication with the smart gauge.

Figure 13B:
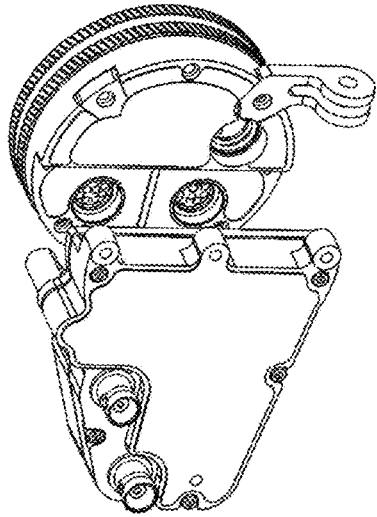
Figure 13A:
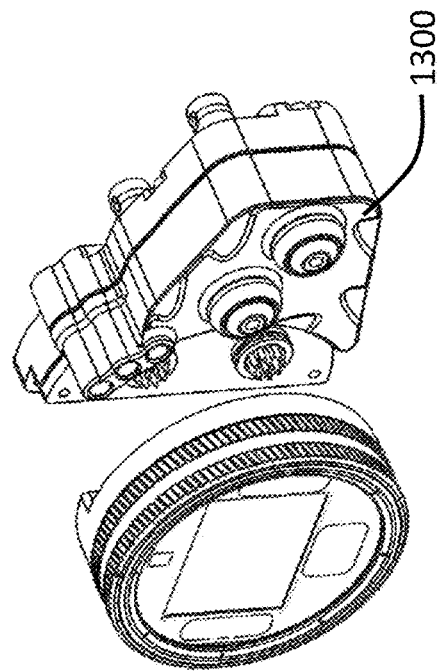
Figure 13D:
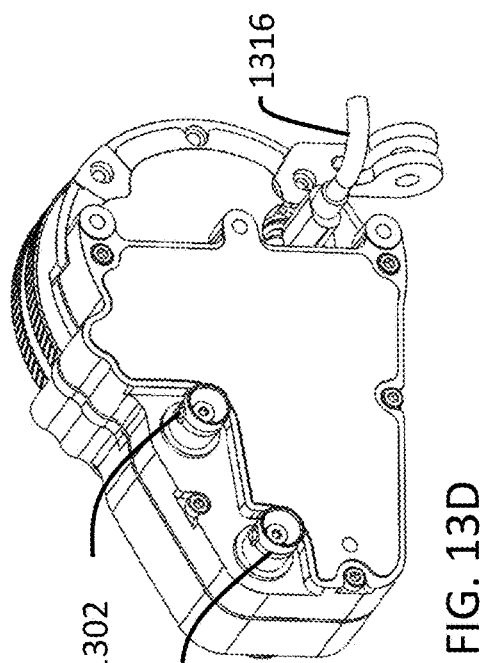

FIG. 13D illustrates a cable 1316 reaching into port 402 to plug into the connector 416 and provide a wired power and data connection to the smart gauge 100.

Modular Functions

The smart gauge is expandable with accessories or expansion modules that enable specific features for various applications. Due to the extreme applications, the smart gauge and its accessories are made weather proof.

Referring now to FIG. 2, a rear perspective of the smart gauge 100 is shown. There are module ports located at the rear, a top module port 204 and bottom module port 206.

Accessories can connect to these module ports providing a sealed electrical connection. These accessories can utilize mounting holes 208 for retention. The module ports are rotated proportionally so that a module or accessory could attach to any module port. For example a particular module could be attached to port 204 and/or port 206.

In other embodiments there could be none, or any number one or more of module ports. Different module mounting hole 208 patterns or arrangements could also be used. Rather than a threaded screw, and snap or clipping mechanism could be used.

Referring now to FIGS. 11A-11B and 11A-11D, the smart gauge 100 supports expansion modules to provide additional function for the smart gauge 100. FIGS. 12A-12B illustrate a light module 1100. FIGS. 13A-13D illustrate a wireless communication module 1300. The wireless communication module 1300 may provide radio frequency or satellite communication with the smart gauge 100.

There is a pogo pin connector on the expansion modules with a customized pin arrangement. Around the pins is a jacket with a radial seal 1002 mating with a female pocket 204 on the smart gauge. The mate provides a water tight sealed electrical connection that can be used a number of times.

The light module 1100 can provide signal lights to the user for advanced navigational features for example. As shown in FIG. 12B, the light module 1100 includes a rear module housing portion 1210, an expansion module printed circuit board 1212, a front module housing portion 1214, and a module o-ring seal 1202. Mounted to the printed circuit board 1212 are a light controller device 1250 and a plurality of light emitting diodes 1252A-1252C coupled to the light controller device 1250 by the wire traces of the printed circuit. An electrical connector 1260 is further mounted to the printed circuit board and coupled to the light controller device 1250 and the plurality of light emitting diodes 1252A-1252C to provide at least power to each from the smart gauge. The electrical connector 1260 includes a plurality of spring loaded pins 1204 as is better shown in FIG. 12A.

The electrical connector 1260 and its plurality of spring loaded pins 1204 extend into and out through a cylindrical opening in the hollow cylindrical shaft 1224 of the front module housing 1214. Ends of the spring loaded pins 1204 couple to the contacts 404,406 of the main printed circuit board 150 to form an electrical connection between the expansion module and the smart gauge.

A plurality of light pipes 1254A-1254C are respectively mounted in the light fixture 1222 over the plurality of the light emitting diodes 1252A-1252C. The light pipes direct the light out the front side of the smart gauge so that they are visible to the user.

Referring now to FIGS. 13A-13D, the wireless communication module 1300 includes a printed circuit board with a wireless radio mounted to it. The wireless radio is selected to provide the desired wireless communication for the user. The wireless communication module 1300 is adaptable to the smart gauge. The wireless communication module 1300 allows the transfer of information via a five mile local range network and two way messaging through a satellite network.

Utilizing communication module 1300 vehicles can talk with each other up to five miles away and share GPS position data along with other information. Devices can monitor the location of other nearby devices. They can alert other vehicles if there is a distressed or crashed vehicle. The vehicles can allow for pass detection which improves safety in racing situations. Much faster moving vehicles can alert slower moving vehicles giving them time to get out of the way, preventing hazardous situations. The LEDs 1310 can be used to alert the drivers of a message and identify a particular type of message or notification. The communication module 1300 includes one or more safety alert buttons 1308,1306 that allows users to communicate distress to other listening smart gauge 100 devices with the communication module 1300. If within the range of the local range network (e.g., 5 miles), other vehicles are notified of the distress and can provide aid.

Applications

Figure 15A:
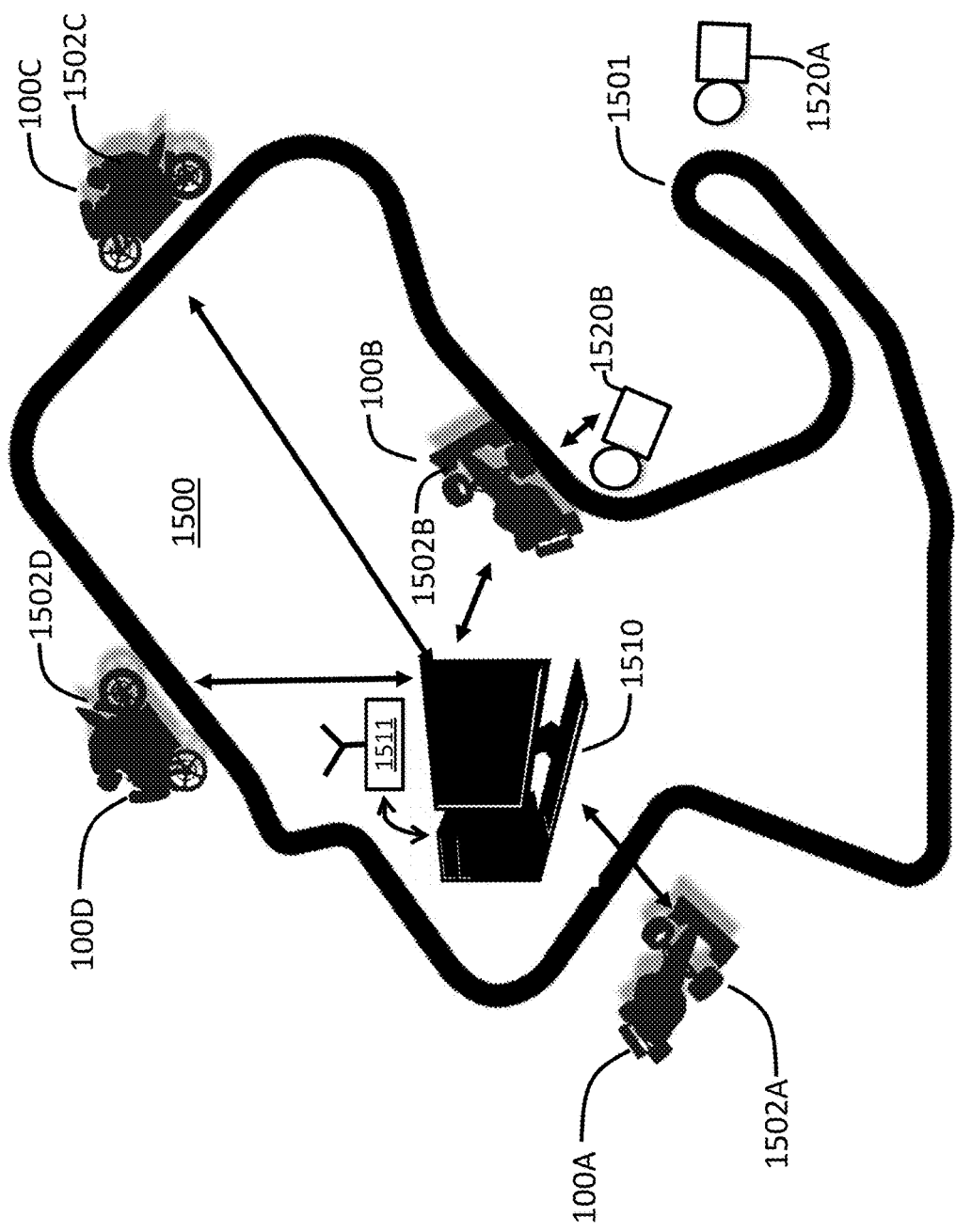

Referring now to FIG. 15A, a local network 1500 is formed around a race track 1501 by and between smart gauge 100A-100D in a plurality of vehicles 1502A-1502D and a base station 1510 with a wireless radio transmitter/receiver 1511. Each of the vehicles 1502A-1502D includes a respective smart gauge 100A-100D with a communications module 1300. Accordingly, each smart gauge 100A-100D is in bi-directional wireless radio communication with the base station 1510 using the communications module 1300. The base station 1510 can communicate to each smart gauge through the radio transmitter/receiver 1511 and the communications module 3100. The base station 1510 can send messages, including broadcast messages of caution signals and alerts for all the racers, to each smart gauge 100A-100D.

Each smart gauge 100A-100D communicates to the base station. Each smart gauge 100A-100D tracks the position of its respective vehicle 1502A-1502D along the racetrack 1501 using its GPS radio receiver. Each smart gauge 100A-100D further includes a three dimensional accelerometer to sense motion. Along with performance measurements, the accelerometer in the smart gauge 100 can detect a crash of a vehicle to which it is coupled. The smart gauge can then automatically communicate to the base station 1510 that a crash has occurred in the vehicle to which it is coupled. With the tracking information from the GPS radio receiver, the smart gauge can also communicate the location of the crash of the vehicle along the track. The base station can in turn automatically broadcast a caution notification that is sent to the smart gauges in all vehicles on the track. In response to the caution notification, each smart gauge notifies the user that a crash has occurred and indicates the crash position along the track where the crash occurred. The display device in each smart gauge can display a race track map with the position of the crash along the race track and the position of the vehicle to which it is attached.

A race track may have one or more cameras 1520A-1520B adjacent the track to capture video images or still images of a vehicle as it approaches and/or leaves a range or a point the location of the one or more cameras. The one or more cameras 1520A-1520B may be wirelessly synchronized with the position of the vehicles 1502A-1502D as they travel around the predetermined track by the smart gauges. As a vehicle comes within wireless radio range, the camera and the smart gauge can sync up and then images may be captured at predetermined points. For example, the camera 1520B and vehicle 1502B are within wireless radio range of each other. The camera 1520B synchronizes with the smart gauge 100B and captures images of the vehicle 1502B as it goes around the turn of the track where the camera is located.

One or more cameras may also be mounted to a vehicle, synchronized with a smart gauge, to capture images from that perspective or frame of reference. Data captured by the smart gauge, such as vehicle performance for example, may be overlaid onto the captured images in time synchronization. For example, the velocity or speed of a vehicle as it races around a track can be overlaid onto the video images captured by a camera. The velocity data is synchronized with each image so the velocity information may change between frames of images, such as when breaking before entering a turn and accelerating when leaving the turn.

Figure 15B:
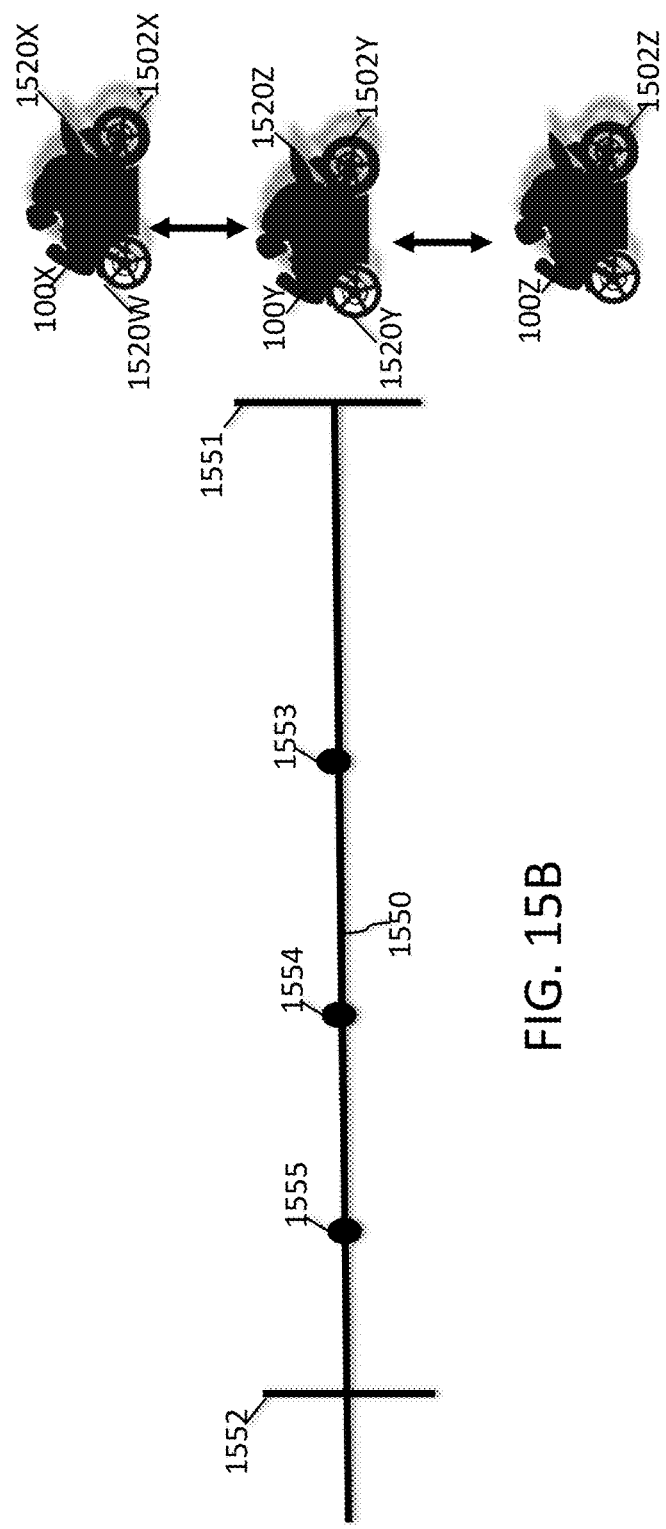
Figure 15C:
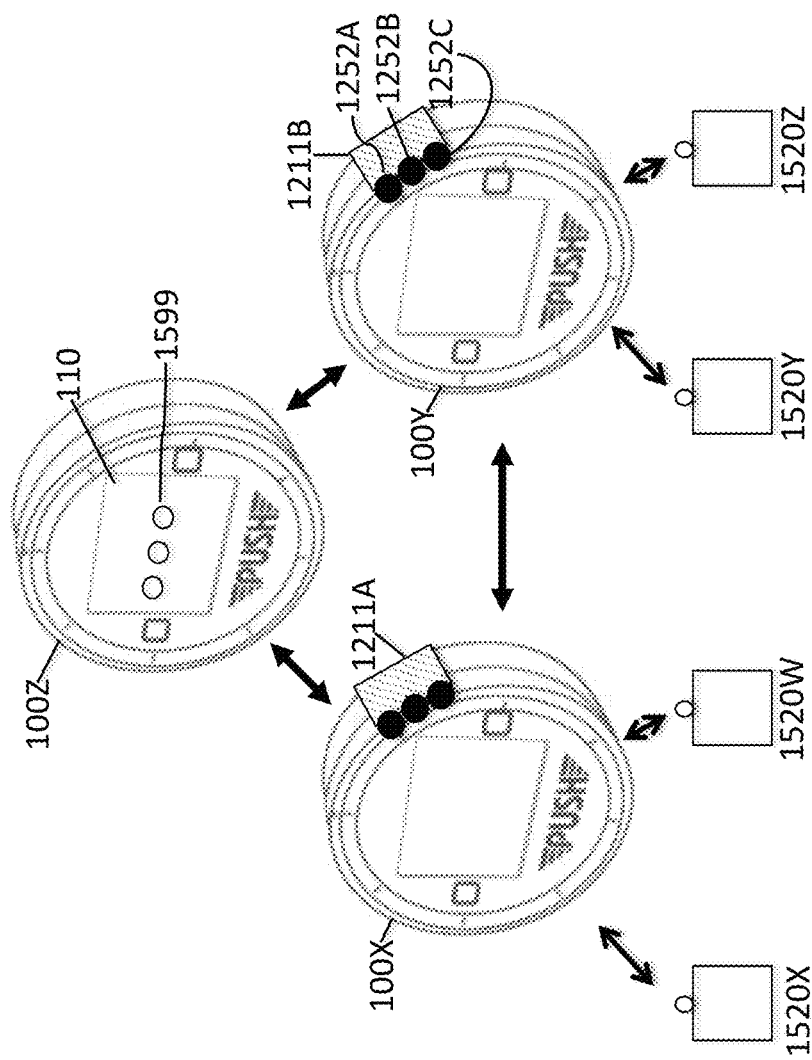

Referring now to FIGS. 15B-15C, a plurality of vehicles 1502X,1502Y,1502Z with smart gauges 100X,100Y,100Z are preparing to drag race along a track 1550 having a starting point or start line 1551 and a finishing point or finish line 1552. One or more check points or way points 1153-1555 may also be set up for check in during a race or rally.

The vehicles 1502X,1502Y include a pair of cameras located at different positions on the vehicle to capture different points of view. Vehicle 1502X includes cameras 1520W-1520X with wireless radios to communication with the smart gauge 100X. Vehicle 1502Y includes cameras 1520Y-1520Z with wireless radios to communication with the smart gauge 100Y. The smart gauge of each vehicle can synchronize real time data capture with the image capture of their cameras so that performance data can be automatically overlaid onto the images captured by each camera.

Moreover, two or more smart gauges 100X,100Y,100Z within local range of each other can wirelessly communicate with each thereby other forming a mesh network. In this manner, the two or more smart gauges 100X,100Y,100Z can be synchronized together in time and position at the start of a race or rally. The mesh network of smart gauges communicating to one another may also be used with a point to point radio system to communicate with a base station, such as shown in FIG. 15A.

A starting point, a finish point, and any check points can be input into one of the smart gauges and communicated to one or more other smart gauges to set up a programmed race. Each user with smart gauges in local communication with one another may press a ready button on the smart gauge so they all communicate they are ready to participate in the programmed race. The users can then move to the starting point or line 1551 so that the programmed race or rally can begin. The users may concurrently race together or they may serially race over the same track for later comparison of time and performances. The programmed race may be save so that other users can perform the same at later dates and times.

The smart gauges 100X,100Y can each include the light expansion module 1211A,1211B with the LEDs 1252A-1252B. Once at the starting point, the LEDs 1252A-1252B or the smart gauge user interface 1599 displayed by the display device 110 of smart gauge 100Z is programmed to act like a tree of racing lights to indicate the start of a virtual race or rally to the user. Once the user competes the track/course by reaching the finish line or point, the recorded performances and time captured by each smart gauge can be subsequently compared with other users to determine the best performance amongst a group of two or more synchronized smart gauges. The performance can readily be loaded up to social media web sites for sharing/comparison.

Figure 13C:
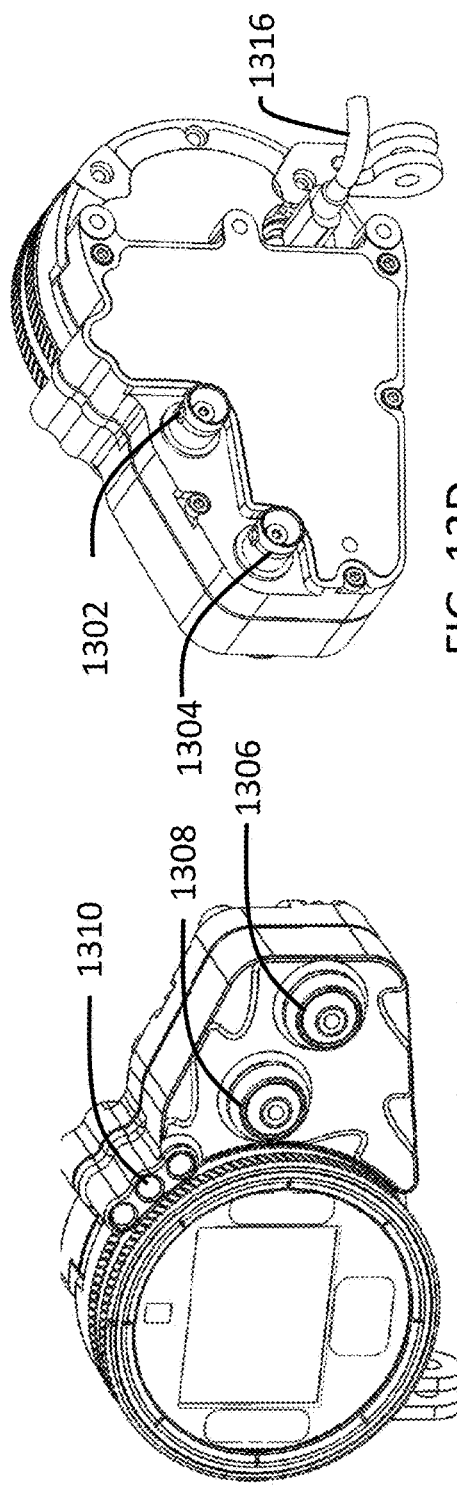

In some cases, races or rallies are not run on local tracks adjacent a base station such as shown in FIG. 15A. A user may need to manually communicate his status when participating in an action sport event with a vehicle. The communications module 1300 includes a pair of push buttons 1306,1308 as is shown in FIG. 13C. It also provides a pair of external antenna radio frequency jacks to couple to one or more antennas that may be designed and tuned to predetermined radio frequency bands of a radio communication system.

The buttons 1306,1308 of the communications module 1300 can be programmable to communicate any type of signal from the smart gauge 100 to the base station 1510. The buttons 1306,1308 can be programmed to be emergency alert buttons that communicate emergency situations or medical alerts from the smart gauge to the base station. The emergency alert buttons may be used primarily for remote emergency applications, such as may occur in off road racing, aviation, or adventure sports.

Figures 16A, 16B, 16C:
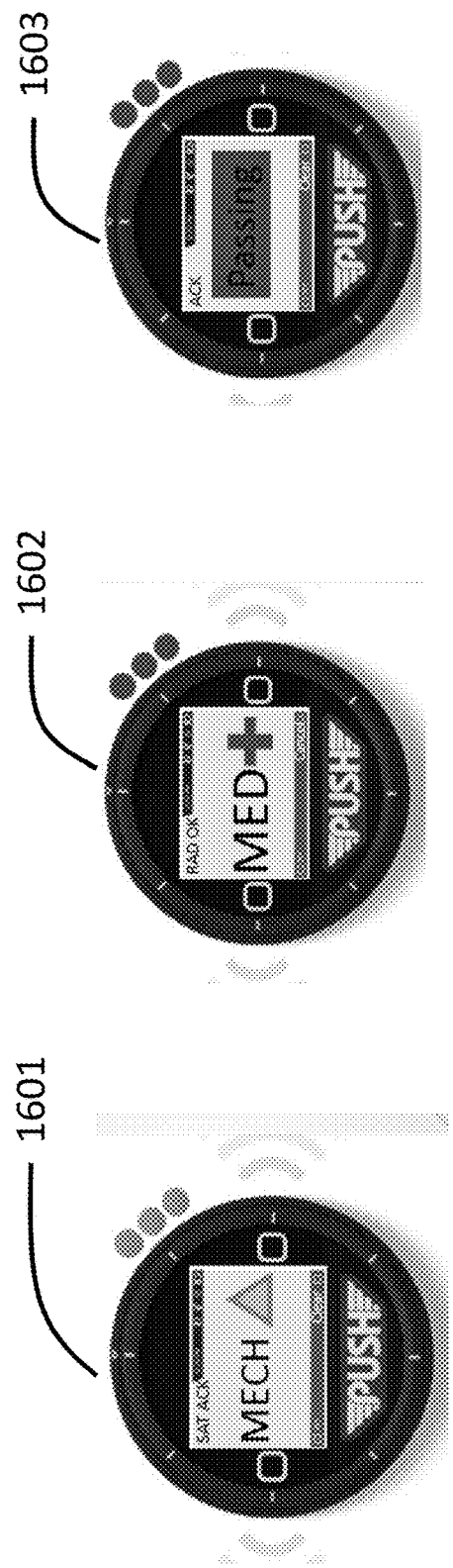

As shown in FIGS. 16A-16B, the rotatable ring of the user interface may also be used to selectively communication an emergency situation. A mechanical breakdown page 1601 as shown in FIG. 16A may be selected by the rotatable ring and one of the buttons 1050A-1050C pushed to communicate such. A medical emergency page 1602 as shown in FIG. 16B may be selected by the rotatable ring and one of the buttons 1050A-1050C pushed to communicate such. As illustrated in FIG. 16C, during a race, a status page 1603 displayed by the display device of the smart gauge may indicate the ordinary race status of the vehicle, such as passing another vehicle for example.

The smart gauge 100 with the communications module 1300 includes multiple wireless radios so that it can communicate an emergency message over multiple wireless networks, such as a terrestrial wireless communication network (e.g., cellular telephone network) and a non-terrestrial wireless communication network (e.g., through a satellite network—iridium satellite network).

A satellite communication network is particularly useful for live tracking applications outside a cellular telephone network. The satellite communication network may be used to track terrestrial vehicles having a smart gauge. The satellite communication network can also be used to track non-terrestrial vehicles with a smart gauge, such as airplane with a smart gauge, for example.

Figure 15D:
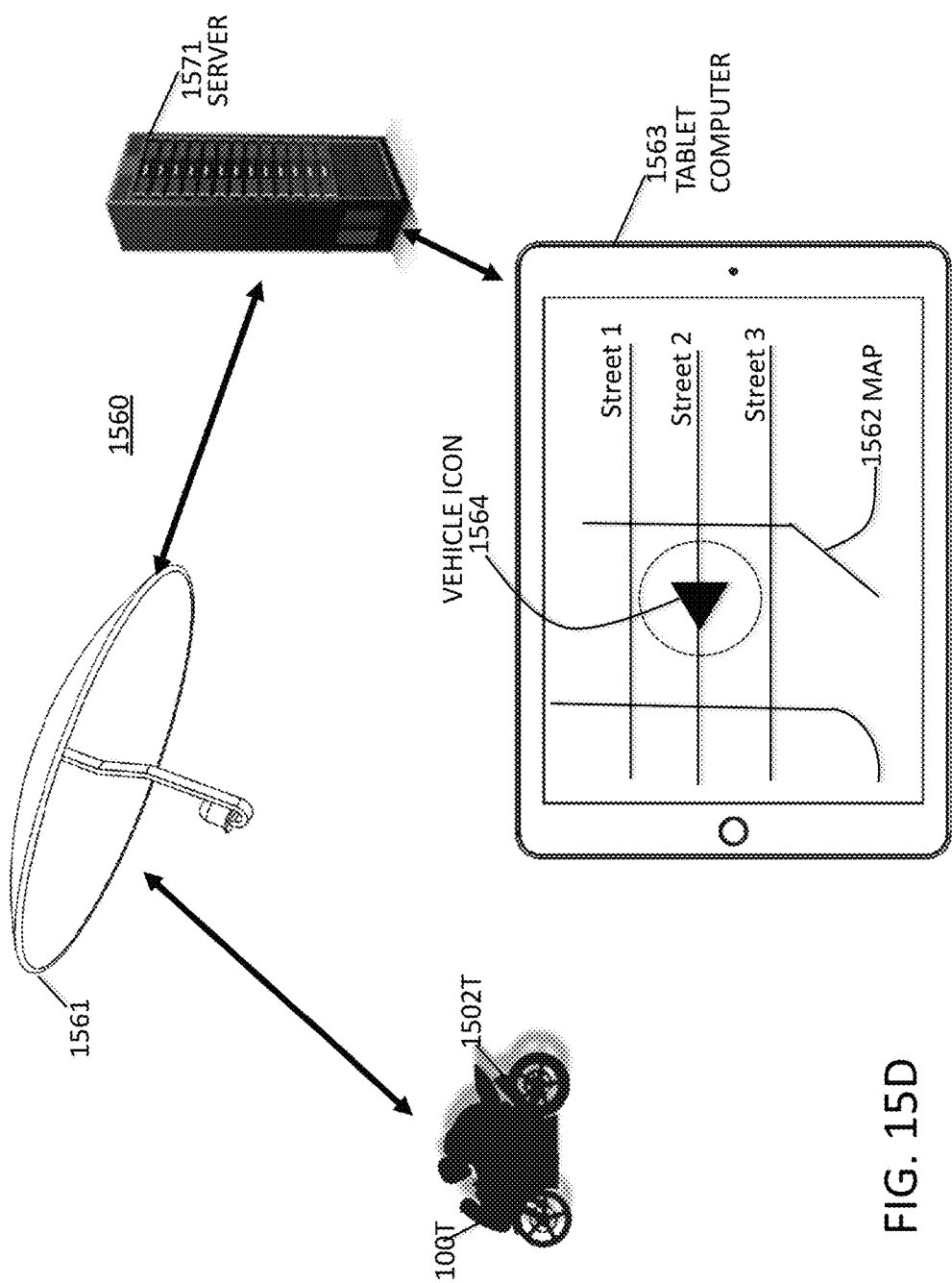

Referring now to FIG. 15D, a satellite/antenna 1561 of a satellite/cell phone communication network 1560 is particularly useful for live tracking applications outside a cellular telephone network. The satellite communication network or a cellular communication network 1561 can be used to track terrestrial vehicles that have a smart gauge. The terrestrial vehicle 1502T, such as a motorcycle, has a smart gauge 100T with a satellite or cell phone tracking capability. The smart gauge 100T can be used to update a live position of the terrestrial vehicle 1502T to a server 1571 and an online account. The tracking and live position update of the vehicle stored in the server 1571 can be accessed through a smartphone, tablet computer, or computer 1563 using the online account. A map user interface 1562 can be displayed by the display device of the computer 1563, including a vehicle icon 1564 and the street names around the location of the vehicle icon. The smart gauge 100T includes a GPS radio and may be outfitted with an expansion radio module to automatically communicate its position in order to track the terrestrial vehicle position. This may be useful to locate a lost or stolen vehicle for example.

Figure 17:
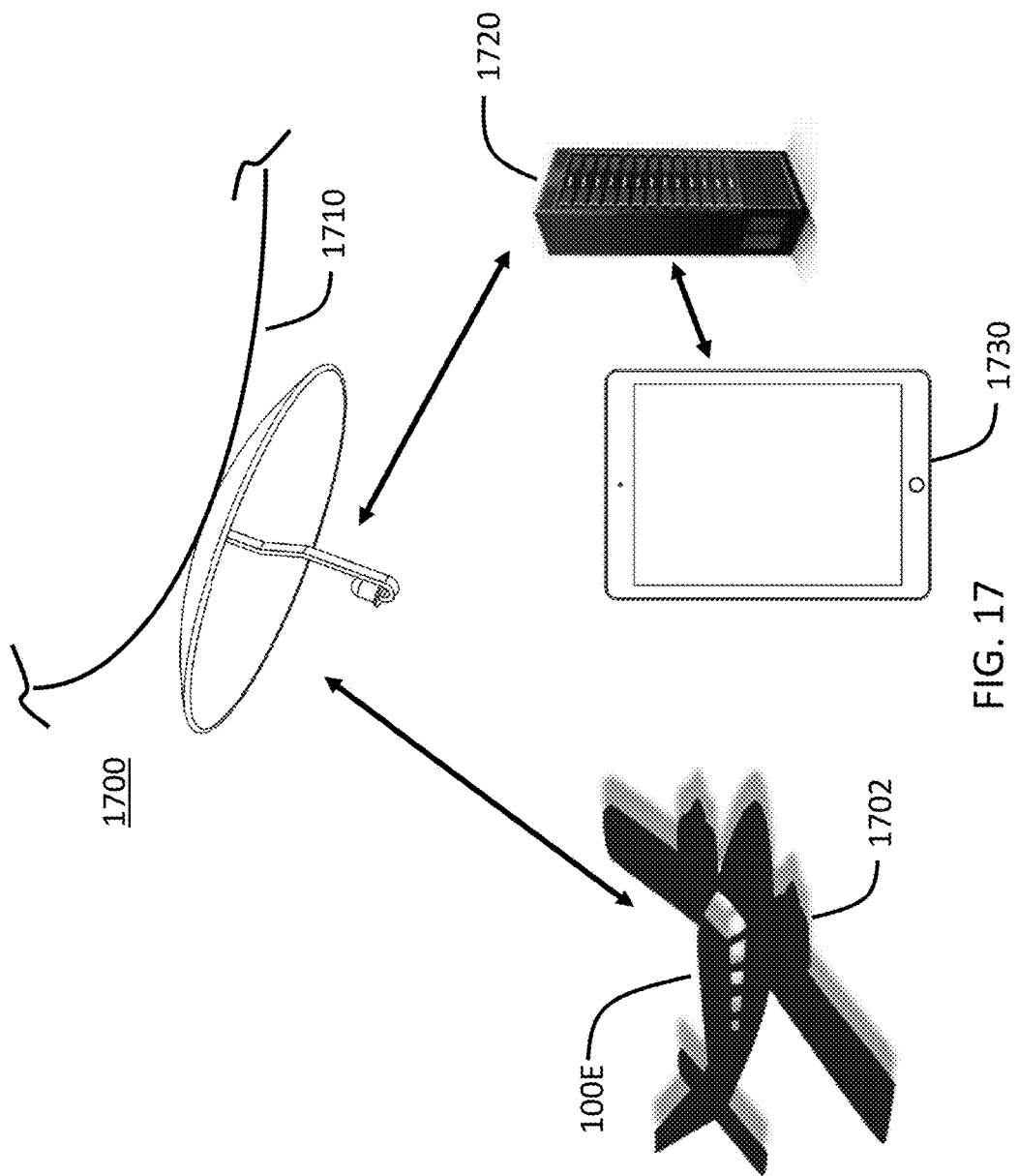

Referring now to FIG. 17, a satellite 1710 of a satellite communication network 1700 is particularly useful for live tracking applications outside a cellular telephone network. The satellite communication network 1700 may be used to track terrestrial vehicles having a smart gauge. The satellite communication network 1700 can also be used to track non-terrestrial vehicles with a smart gauge, such as airplane 1702 with a smart gauge 100E, for example. The smart gauge 100E can be used to update a live position of the airplane 1702 to a server 1720 and an online account. The tracking and live position update of the vehicle stored in the server 1720 can be accessed through a smartphone or tablet computer 1730 using the online account. The smart gauge 100T includes a GPS radio and may be outfitted with an expansion radio module to automatically communicate its position in order to track the vehicle position. This may be useful to locate a lost or stolen vehicle for example.

Figure 18:
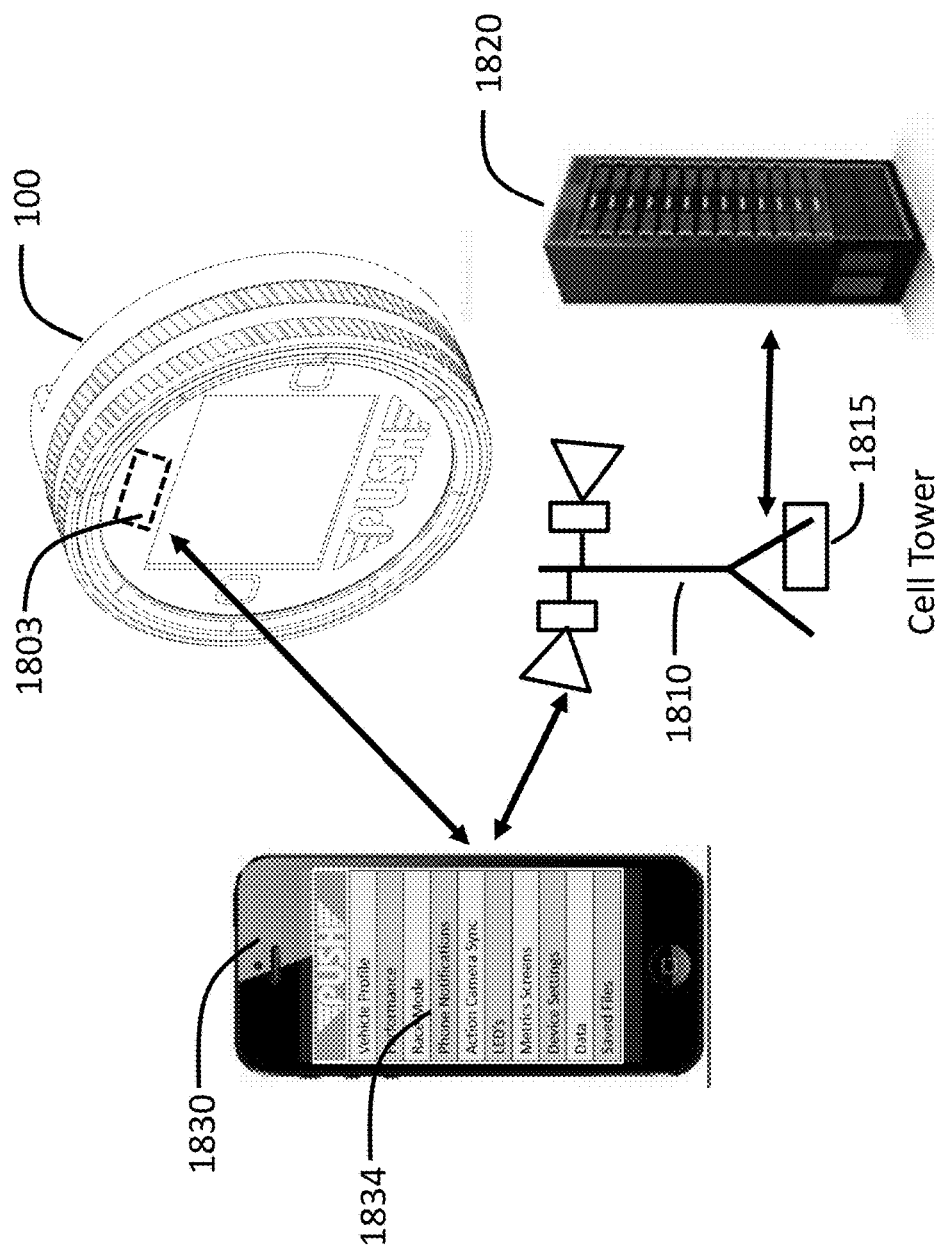

Referring now to FIG. 18, drivers of vehicles 1502A-1502D often have a smartphone 1830 with them in the vehicle that includes a low power near field radio, such as a Bluetooth radio. The smart gauge 100 has an internal low power near field radio 1803, a Bluetooth protocol radio that can communicate with other Bluetooth radio devices that are found in smartphones 1830. A wireless radio system 1800 including the smart gauge 100, the smartphone 1830 can be formed with a wireless near field communication channel there between. Furthermore, smartphones 1830 are often in communication with cell phone base stations 1815 at cell phone towers 1810 of cellular telephone networks. The cell phone base stations 1815 can communicate with a server 1820 over a wide area network, such as the world wide web or the internet.

The smartphone further includes a processor, a display device and a storage device for storing software instructions. A mobile smart gauge software application 1500 with software instructions executed by the processor of the smartphone can be stored in the storage device of the smartphone. The mobile smart gauge software application 1500 allows the smartphone 1830 to wirelessly connect to the smart gauge 100 using the local near field radio in each. While the smart gauge 100 has internal data storage to concurrently store smart gauge data such as tracking GPS position, compass direction, altitude, performance (velocity/speed, acceleration, elapsed time, lap time, etc.), live smart gauge data may be sent to a server 1820 over the cellular telephone network. Moreover, a history of smart gauge data can be stored in the smart phone 1830 when the cellular telephone network is unavailable and subsequently sent to a server 1820 when the cellular telephone network becomes available. Moreover, a history of smart phone data can be backed up to the server 1820 periodically.

The mobile smart gauge software application 1500 allows users to change device settings of the smart gauge, update smart gauge software stored in the smart gauge, import data into the smartphone, and back up smart gauge data from the smart gauge to a server 1820. Once the smart gauge data is backed up and saved into a server 1820, the smart gauge data can be accessed by multiple devices so that it can be managed and shared with others.

Figure 19:
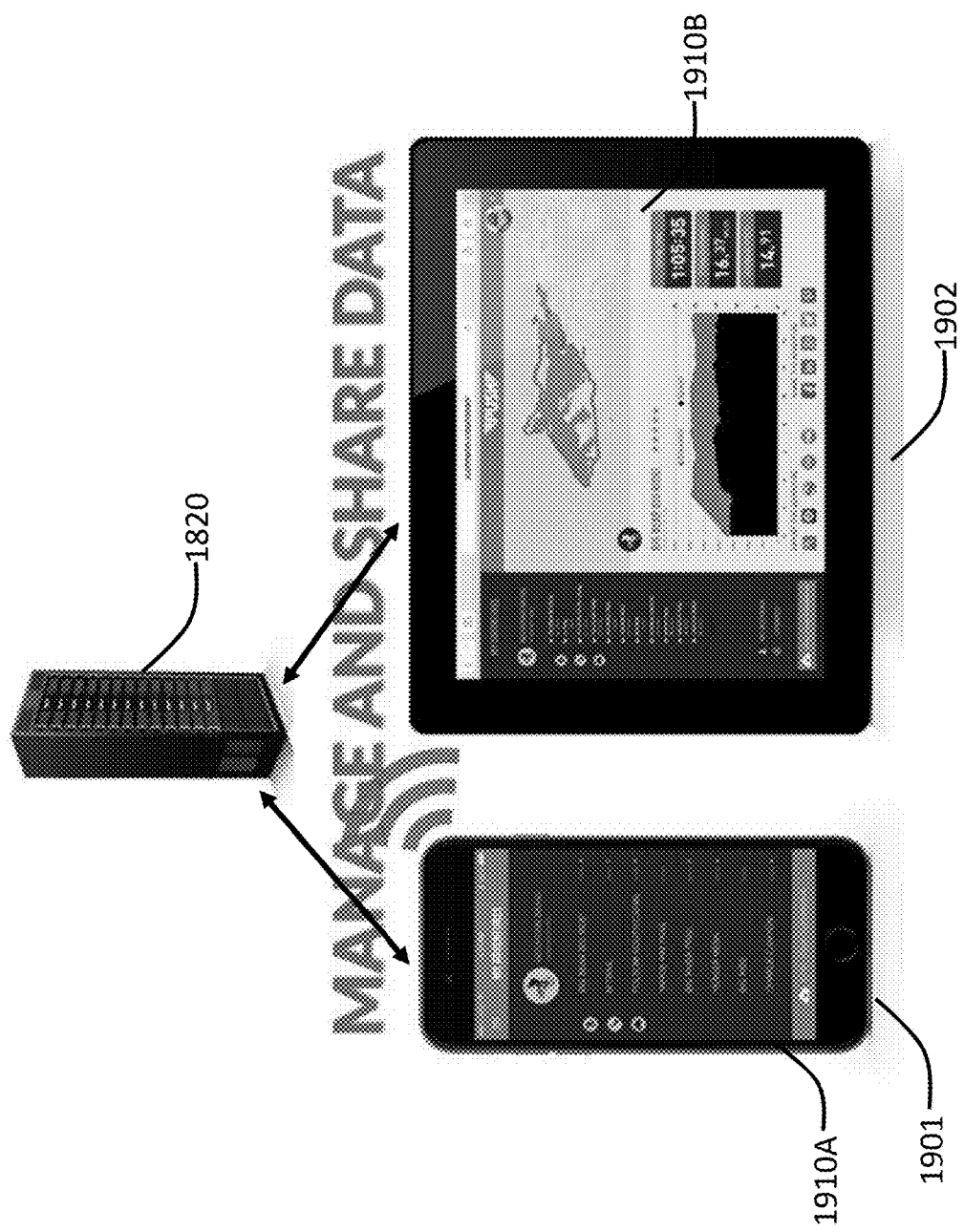

Referring now to FIG. 19, smart phones 1901 and tablet computers 1902 with privileges and a connection providing a communication channel to the server 1820, can access the smart gauge data stored on a server 1820. Smart phones 1901 and tablet computers 1902 executing client software applications 1910A-1910B can view and export the smart gauge data. The smart phones 1901 and tablet computers 1902 can manage and share the smart gauge data in a variety of ways using the client software applications 1910A-1910B.

Figure 20:
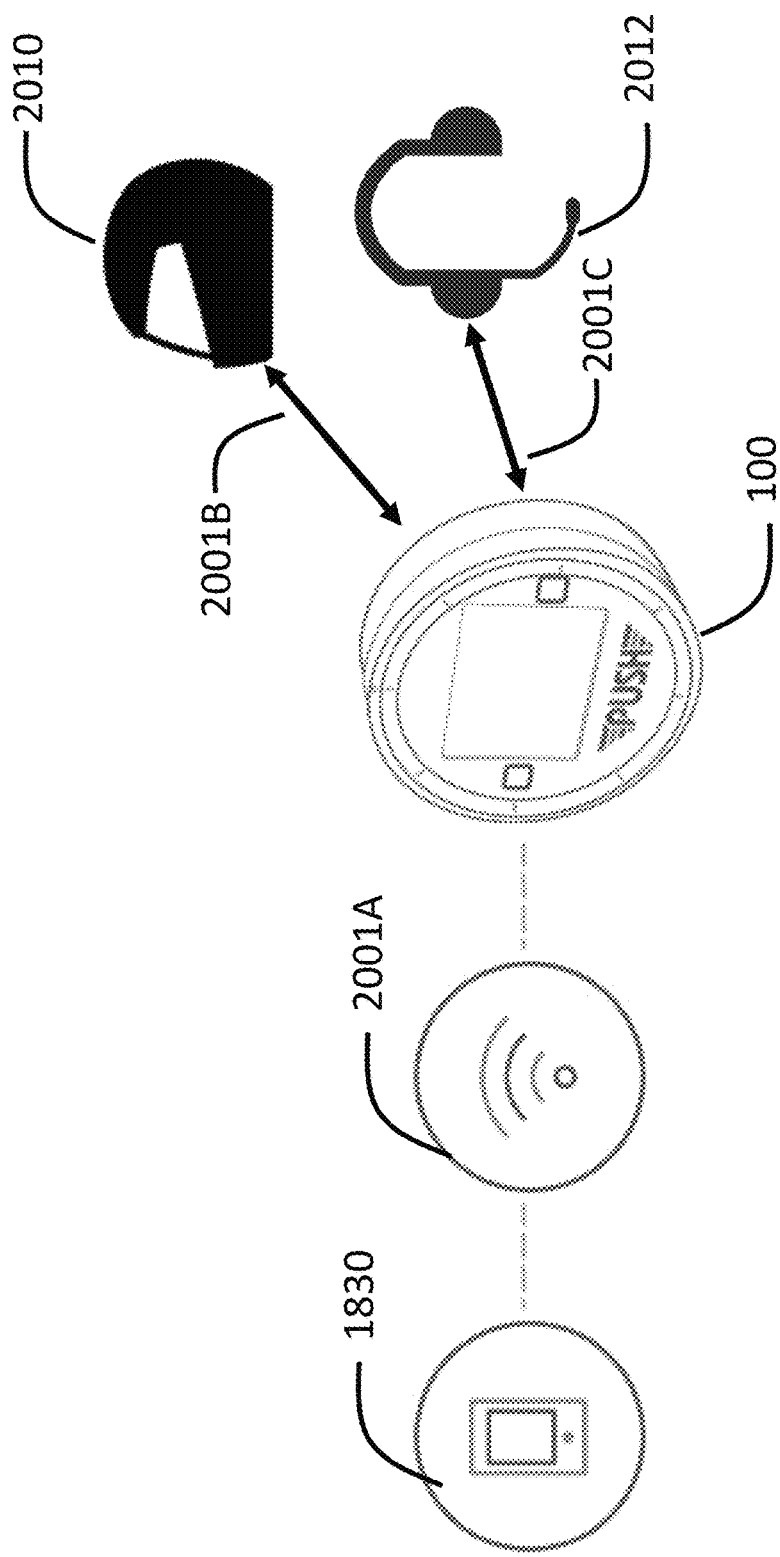

Referring now to FIG. 20, the smart gauge 100 can be tethered to a smart phone 1830 using the Bluetooth radios in each to form a near field wireless radio communication channel 2001A as shown. Other near field wireless radio communication channels 2001B-2001C can be formed between the smart gauge 100 and other near field communication devices a user may have with them in a vehicle, such as a smart helmet 2010 or a wireless headset 2012, for example. Audio information may be relayed from the smart phone 1830 to the smart gauge 100. Audio information may be relayed from the smart gauge 100 to the smart helmet 2010 or the wireless headset 2012. The smart gauge 100 avoids openings associated with a microphone and a speaker to maintain is water resistance. However, an expansion module with a speaker and a microphone may be added, that would not have as much water resistance, to provide audio communication with the smart gauge.

The smartphone 1830 is often stowed away in the vehicle while the smart gauge 100 is readily visible in line of sight of the user, such as near the windscreen/windshield or other gauges/instruments of the vehicle. Over the communication channel 2001A, the smartphone 1830 can use the display device of the smart gauge 100 to relay information to the user when operating a vehicle. Accordingly, notifications can be sent from the smartphone 1830 to the smart gauge 100. Moreover, the smart phone 1830 can be remotely controlled by the smart gauge 100 through the near field wireless radio communication channel 2001A.

Referring now to FIG. 21A, the display device of the smart gauge 100 can be used to display a user interface page 2101 that notifies the user that a phone call has been placed to the smart phone 1830. The user interface page 2101 can indicate the calling telephone number or other caller identification information such as name of address book information associated with the calling telephone number. The user interface page 2101 can further indicate the contextual function of the touch sensitive buttons 1050A,1050C to be answer or message to either pickup the call or to ignore it to take a voice mail message. If the user has a smart helmet or a headset 2012 with at least one speaker and microphone, the user can select the button to answer the call and communicate with the party on the other end of the telephone call through the smart gauge 100 using the near field wireless radio communication channels 2001A-2001B, for the example.

Referring now to FIG. 21B, the display device of the smart gauge 100 can also be used to display a user interface page 2102 that notifies the user that text message has been received by the smart phone 1830. The user interface page 2102 can further indicate the contextual function of the touch sensitive buttons 1050A,1050C to be scroll up or scroll down the text messages that have been received by the smart phone 1830. Another touch sensitive button 1050B of the smart gauge may be used to send a predetermined reply text message to the sender of such message. The predetermined reply text message may for example, inform the text sender that the user is busy operating a vehicle and will need to reply more thoroughly later.

Referring now to FIG. 21C, the display device of the smart gauge 100 can also be used to display a user interface page 2103 that displays navigation information, such as turn by turn directions from a starting point to an end destination. The smart gauge 100 includes a GPS system and its processor can execute a navigational map module to display the turn by turn directions of the user interface page 2103.

Figure 23:
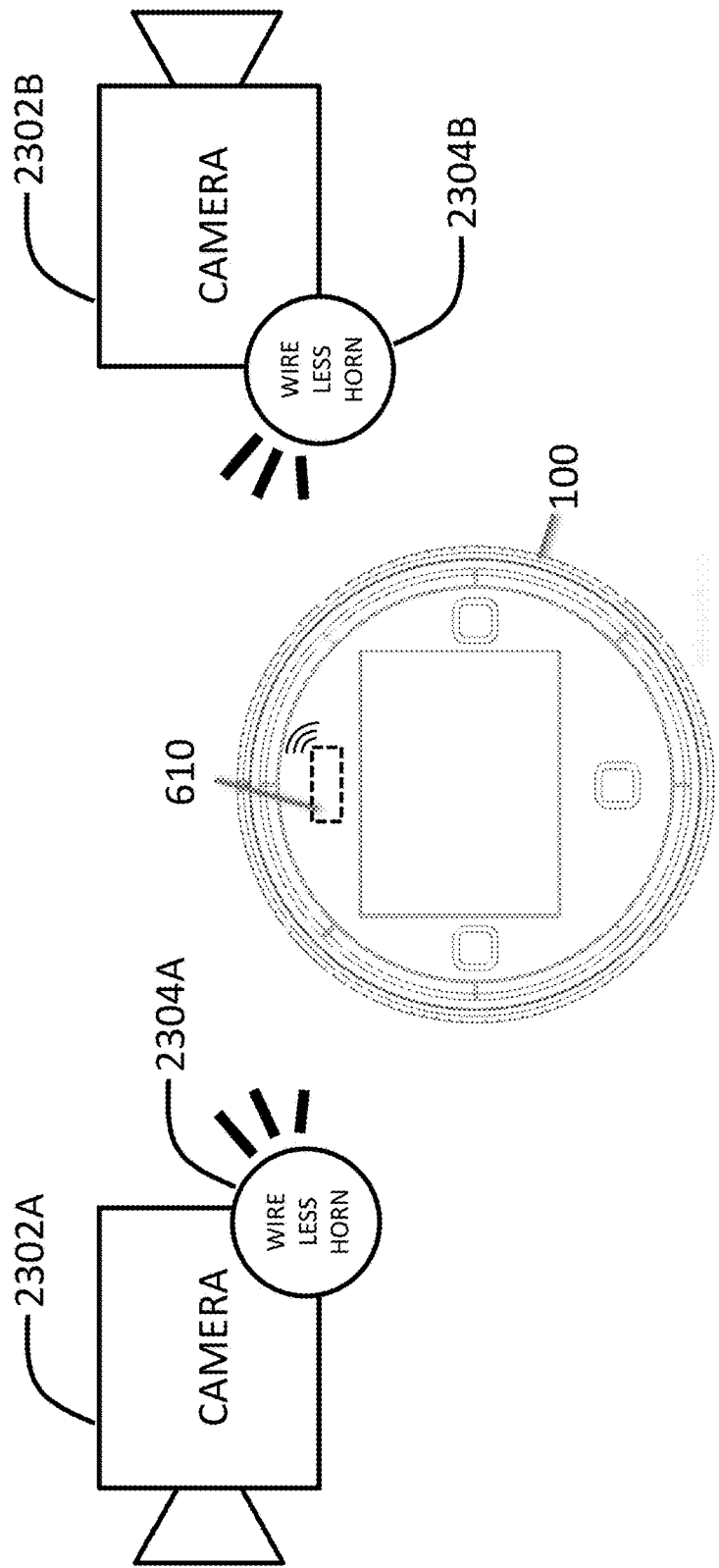
FIG. 23 illustrates a diagram showing synchronization of cameras and their associated buzzers or horns with the smart gauge.

Referring now to FIG. 23, the smart gauge 100 can be used to synchronize and control the start and stop video capture of one or more cameras 2302A-2302B. The recorded video captured by each of the one or more cameras 2302A-2302B can be synchronized with the recorded performance data and/or motion data captured by the smart gauge 100.

The smart gauge 100 can audibly alert the user to the start and stop of the video capture with a remotely controlled wireless buzzer or horn. One or more of the cameras 2302A-2302B may include a remote controlled wireless buzzer or horn 2304A-2304B. Using its local radio, a Bluetooth radio 610 for example, the smart gauge 100 can establish wireless radio communication channels with the remote controlled wireless buzzer or horn 2304A-2304B. The smart gauge 100 can then remotely and wirelessly control the activation of the remote controlled wireless buzzer or horn 2304A-2304B that may be coupled to or included in the one or more cameras 2302A-2302B.

With the cameras 2302A-2302B being synchronized with the smart gauge 100, the recorded motion and/or performance data captured by the smart gauge can then be readily overlaid onto the video and still images captured by each camera.

CONCLUSION

The embodiments are thus described. While certain exemplary embodiments have been described and shown in the accompanying drawings, it is to be understood that such embodiments are merely illustrative of and not restrictive, and that the embodiments not be limited to the specific constructions and arrangements shown and described, since various other modifications may occur to those ordinarily skilled in the art.

When implemented in software, the elements of the embodiments of the invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

While this specification includes many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations, separately or in sub-combination. Moreover, although features may be described above as acting in certain combinations and even initially claimed as such, one or more features from a claimed combination may in some cases be excised from the combination, and the claimed combination may be directed to a sub-combination or variations of a sub-combination. Accordingly, the claimed invention is limited only by patented claims that follow below.

What is claimed is:

1. An apparatus comprising:
a circular cylindrical hollow housing;
one or more hall effect sensors located near an inner circular cylindrical surface of the circular cylindrical hollow housing;
a control ring rotatably coupled to an outer circular cylindrical surface of the circular cylindrical hollow housing;
a plurality of magnets coupled to an inner circular cylindrical surface of the control ring; and
wherein as the control ring is rotated about the outer circular cylindrical surface, one or more magnets of the plurality of magnets magnetically couple to the one or more half effect sensors and generate one or more control signals.

2. The apparatus of claim 1, wherein
the circular cylindrical hollow housing is a non-ferrous alloy housing or a plastic housing to allow a magnetic field to pass from the one or more magnets through the housing to the hall effect sensors.

3. The apparatus of claim 1, wherein
one of the plurality of magnets coupled to the inner circular cylindrical surface of the control ring is positioned to have a reverse polarity from other magnets of the plurality of magnets so that the reverse polarity of the one magnet generates an index signal differing from the one or more control signals.

4. The apparatus of claim 1, further comprising:
a first printed circuit board (PCB) mounted in the circular cylindrical hollow housing;
a processor mounted to the first PCB, the processor coupled to the one or more hall effect sensors to receive the one or more control signals.

5. The apparatus of claim 4, further comprising:
a second PCB mounted in the circular cylindrical hollow housing, wherein the one or more hall effect sensors are mounted to the second PCB.

6. The apparatus of claim 4, further comprising:
a ribbon cable coupled between the one or more hall effect sensors and the first PCB, the ribbon cable electrically coupling the one or more hall effect sensors to the processor.

7. The apparatus of claim 5, further comprising:
one or more touch pads coupled to the processor, the one or more touch pads capable of generating user selected control signals in response to touch by a user.

8. An apparatus comprising:
a cylindrical housing;
a main printed circuit board mounted in the cylindrical housing, the main printed circuit board including
a processor to execute instructions in response to control signals;
a global positioning system (GPS) radio coupled to the processor, the GPS radio to track the position of the apparatus and user associated with the apparatus;
a magnetometer coupled to the processor to determine compass direction; and
at least one wireless radio coupled to the processor, the at least one wireless radio for bidirectional communication;
one or more hall effect sensors mounted to a second printed circuit board and coupled to the processor, the one or more hall effect sensors to communicate control signals to the processor;
a display device coupled to the processor, the display device to display a user interface;
one or more touch pads coupled to the processor adjacent the display device, the one or more touch pads capable of generating user selected control signals in response to touch by a user;
a control ring rotatably coupled to the cylindrical housing, the control ring having one or more magnets to magnetically couple to the hall effect sensors and generate control ring control signals; and one or more rechargeable batteries coupled to the processor, the rechargeable batteries to provide power to the main printed circuit board including the processor, the GPS radio, and the magnetometer; the display device; the one or more hall effect sensors; and the one or more touch pads.

9. The apparatus of claim 8, further comprising:
an accelerometer coupled to the processor, the accelerometer configured to take performance readings as the cylindrical housing is moved about.

10. The apparatus of claim 8, wherein
the one or more touch pads are capacitive touch pads to generate the user selected control signals.

11. The apparatus of claim 8, further comprising:
flash memory coupled to the processor, the flash memory to store instructions for execution by the processor.

12. The apparatus of claim 8, further comprising:
a second wireless radio coupled to the processor,
an antenna coupled to the second wireless radio,
wherein the second wireless radio provides wireless communication between the processor and a server over a point to point wireless network, a mesh wireless network, or a satellite wireless network.

13. The apparatus of claim 8, further comprising:
a light controller coupled to the processor,
a plurality of light emitting diodes coupled to the light controller,
wherein the light controller and the plurality of light emitting diodes communicate status to a user.

14. The apparatus of claim 8, further comprising:
a pressure sensor coupled to the processor, the pressure sensor to sense altitude of the housing.

15. The apparatus of claim 8, further comprising:
an encoder coupled to the processor,
a plurality of switches coupled to the encoder,
wherein the encoder generates control signals for execution by the processor in response to on and off states of the plurality of switches.

* * * * *